United States Patent
Cho et al.

(10) Patent No.: US 12,510,918 B2
(45) Date of Patent: Dec. 30, 2025

(54) INTEGRATED CONTROL APPARATUS FOR AUTONOMOUS VEHICLE

(71) Applicants: Hyundai Motor Company, Seoul (KR); Kia Corporation, Seoul (KR); Kyung Chang Industrial Co., Ltd., Daegu (KR)

(72) Inventors: Jae Wan Cho, Seoul (KR); Won Jin Jeong, Hwaseong-si (KR); Tae Hee Lee, Daegu (KR); In Sung Lee, Daegu (KR); Ji Soo Kim, Daegu (KR); Dae Yeon Kim, Daegu (KR)

(73) Assignees: HYUNDAI MOTOR COMPANY, Seoul (KR); KIA CORPORATION, Seoul (KR); KYUNG CHANG INDUSTRIAL CO., LTD., Daegu (KR)

( * ) Notice: Subject to any disclaimer, the term of this patent is extended or adjusted under 35 U.S.C. 154(b) by 191 days.

(21) Appl. No.: 18/387,586

(22) Filed: Nov. 7, 2023

(65) Prior Publication Data
US 2024/0419204 A1   Dec. 19, 2024

(30) Foreign Application Priority Data
Jun. 14, 2023   (KR) .................. 10-2023-0076209

(51) Int. Cl.
| | |
|---|---|
| *G05G 9/047* | (2006.01) |
| *B60K 26/02* | (2006.01) |
| *B60T 7/08* | (2006.01) |
| *B62D 1/12* | (2006.01) |
| *G05G 5/05* | (2006.01) |

(52) U.S. Cl.
CPC .............. *G05G 9/047* (2013.01); *B60T 7/08* (2013.01); *G05G 5/05* (2013.01); *B60K 2026/029* (2013.01); *B62D 1/12* (2013.01); *G05G 2009/0474* (2013.01); *G05G 2009/04766* (2013.01); *G05G 2505/00* (2013.01)

(58) Field of Classification Search
CPC . G05G 9/047; G05G 5/05; B60T 7/08; B60K 2026/029; B62D 1/12
See application file for complete search history.

(56) References Cited

U.S. PATENT DOCUMENTS

2020/0324773 A1*  10/2020  Kim .................. B60K 20/02

FOREIGN PATENT DOCUMENTS

| | | | |
|---|---|---|---|
| JP | 2002157036 A | * | 5/2002 |
| JP | 4410605 B2 | | 2/2010 |
| JP | 6590285 B2 | | 10/2019 |
| KR | 10-0709772 B1 | | 4/2007 |
| KR | 10-1166895 B1 | | 7/2012 |

* cited by examiner

*Primary Examiner* — Scott A Browne
*Assistant Examiner* — Jason Nguyen
(74) *Attorney, Agent, or Firm* — Morgan, Lewis & Bockius LLP

(57) ABSTRACT

An integrated control apparatus for an autonomous vehicle is configured to perform acceleration, deceleration and steering operations of a vehicle by manipulating a joystick lever. Upon steering operation, feedback control for a steering motor is performed using a torque sensor module 800 to realize more precise steering feeling. A sensor configured to detect acceleration or deceleration position of the joystick lever and a sensor configured to detect a steering position of the joystick lever share a single position sensor PCB.

21 Claims, 19 Drawing Sheets

INTEGRATED CONTROL APPARATUS FOR AUTONOMOUS VEHICLE

CROSS-REFERENCE TO RELATED APPLICATION

The present application claims priority to Korean Patent Application No. 10-2023-0076209, filed Jun. 14, 2023 on, the entire contents of which is incorporated herein for all purposes by this reference.

BACKGROUND OF THE PRESENT DISCLOSURE

Field of the Present Disclosure

The present disclosure relates to an integrated control apparatus for an autonomous vehicle, and more particularly to an integrated control apparatus for an autonomous vehicle which is constructed to make it possible to perform acceleration, deceleration and steering operations of the vehicle using a joystick lever.

Description of Related Art

An autonomous vehicle is a smart vehicle which incorporates autonomous travelling technology for enabling a driver to travel to a destination by itself without having to directly manipulate a handle, an accelerator pedal, a brake pedal or the like.

In the situation in which autonomous travelling technology becomes extensively used, a driver may select either a manual travelling mode in which the driver directly drives a vehicle or an autonomous travelling mode in which the vehicle travels to a destination autonomously.

When an emergency situation occurs during autonomous travelling of a vehicle, any one of the passengers sitting in the vehicle must directly drive the vehicle using his or her hands. To the present end, the vehicle may be provided with an apparatus which is manipulated by a user in a manual driving mode.

For example, there is a case in which a vehicle manager drives a vehicle in a manual driving mode by manipulating a device such as a joystick which is used in an arcade video game.

An apparatus, which is manipulated by a user for travelling of a vehicle in a manual driving mode, is provided with a plurality of switches, which are manipulated for acceleration, braking, steering, shift transmission and the like of the vehicle. Because the apparatus is provided with a plurality of switches which have different functions, the apparatus may be referred to as an "integrated control apparatus".

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing an integrated control apparatus for an autonomous vehicle, which is constructed so that acceleration, deceleration and steering operations of a vehicle are performed using the joystick lever 210, whereby manipulation of operations of the vehicle becomes easy thus satisfying user's needs and improving merchantability.

In accordance with the present disclosure, the above and other objects may be accomplished by the provision of an integrated control apparatus for an autonomous vehicle including a main body, a joystick lever module, which is rotatably coupled to the main body and is configured for being manipulated by a user for acceleration, deceleration and steering of the vehicle, an acceleration and deceleration actuator module, which is coupled to the main body and is connected to the joystick lever module for power transmission, the acceleration and deceleration actuator module being configured to generate reactive force upon activation thereof and to return the joystick lever module, which has been rotated for the acceleration or the deceleration of the vehicle, to a neutral position using the generated reactive force, and a steering actuator module, which is coupled to the main body and is connected to the joystick lever module for power transmission, the steering actuator module being configured to generate reactive force upon activation thereof and to return the joystick lever module, which has been rotated for the steering of the vehicle, to the neutral position using the generated reactive force of the steering actuator module.

The integrated control apparatus may further include a first position sensor module provided at the joystick lever module and the main body to detect acceleration and deceleration positions of the joystick lever module, a second position sensor module provided at the joystick lever module and the main body to detect a steering position of the joystick lever module, and a control module communicatively connected to the first position sensor module and the second position sensor module and configured to receive signals of the first and second position sensor modules and to generate signals pertaining to the acceleration, the deceleration and the steering of the vehicle to control operations of the acceleration and deceleration actuator module and the steering actuator module.

The joystick lever module may be rotated forward or backward for acceleration or deceleration of the vehicle, and may be rotated rightward or leftward for steering of the vehicle.

The joystick lever module may include a joystick lever gripped and manipulated by a user, an acceleration and deceleration shifter through which a lower end portion of the joystick lever extends and which includes a first hole, which extends rightward and leftward to allow rightward and leftward rotation of the joystick lever, the acceleration and deceleration shifter being coupled at right and left end portions thereof to the main body via first bearings to be rotatable forwards and backwards thereof, and a steering shifter, which is coupled to the lower end portion of the joystick lever, which extends through the acceleration and deceleration shifter, via a hinge and which includes a second hole, which extends forwards and backwards to allow forward and backward rotation of the joystick lever about the hinge, the steering shifter being coupled at front and rear end portions thereof to the main body via second bearings to be rotatable rightward and leftward.

A direct connecting structure may not be provided between the acceleration and deceleration shifter and the steering shifter so that the acceleration and deceleration shifter and the steering shifter are not interlocked with each other upon the forward and backward rotation and the rightward and leftward rotation of the joystick lever.

The lower end portion of the joystick lever may be provided with a guide protrusion, which projects outwards, and the second hole may be provided with a guide groove, which is in contact with the guide protrusion, to guide the forward and backward rotation of the joystick lever about the hinge.

The acceleration and deceleration actuator module may include an acceleration and deceleration motor fixed to the main body, a drive gear rotatably coupled to the acceleration and deceleration motor, and a follower gear, which is provided at the acceleration and deceleration shifter and is engaged with the drive gear.

The first position sensor module may include a first permanent magnet coupled to the acceleration and deceleration shifter, and a position sensor PCB, which is fixed to the main body and includes a first Hall sensor which faces the first permanent magnet, the position sensor PCB being configured to detect the acceleration and deceleration positions of the joystick lever based on change of magnetic flux caused by change of position of the first permanent magnet when the acceleration and deceleration shifter is rotated.

The control module may include a main PCB fixed to the main body and a motor controller provided at the main PCB, the main PCB may be configured to send a signal to the motor controller, a signal of the position sensor PCB may be transmitted to the main PCB, and the motor controller is configured to receive the signal of the main PCB to control an operation of the acceleration and deceleration motor.

The steering actuator module may be fixed to the main body, and may include a steering motor connected to the steering shifter for power transmission.

The second position sensor module may include a second permanent magnet connected to the steering shifter and a second Hall sensor provided at the position sensor PCB to face the second permanent magnet, and the position sensor PCB may include a function of detecting a steering position of the joystick lever based on change of magnetic flux attributable to change of position of the second permanent magnet when the steering shifter is rotated.

The first position sensor module and the second position sensor module may share a single position sensor PCB, and the single position sensor PCB may be provided with the first Hall sensor and the second Hall sensor, which are spaced from each other.

The second position sensor module further includes a ball guide to which the second permanent magnet is coupled and which is connected to the steering shifter, and one end portion of the ball guide may be formed to include a shape of a sphere and may be in contact with the steering shifter, and another end portion of the ball guide may extend in a lateral direction of the steering shifter and may be coupled to the second permanent magnet, the ball guide including protrusions, which project forwards and backwards and are coupled to the main body to be rotatable rightward and leftward.

The position sensor PCB may be disposed at one side of a rotation axis of the acceleration and deceleration shifter, the rotation axis of the acceleration and deceleration shifter and a rotation axis of the steering shifter may be disposed to be orthogonal to each other, the ball guide may be disposed at one side based on the rotation axis of the steering shifter so that an end portion of the ball guide, to which the second permanent magnet is coupled, faces the position sensor PCB, and the ball guide may be disposed to be parallel to the rotation axis of the acceleration and deceleration shifter when the joystick lever is not manipulated.

The control module may include a main PCB fixed to the main body and a motor controller provided at the main PCB, the main PCB may be configured to send a signal to the motor controller, a signal of the position sensor PCB may be transmitted to the main PCB, and the motor controller is configured to receive the signal of the main PCB to control an operation of the steering motor.

The integrated control apparatus may further include a torque sensor module disposed between the steering shifter and the steering motor to connect the steering shifter and the steering motor to each other, the torque sensor module being configured to detect change of a magnetic field, which is caused by a rotational difference between the steering shifter and the steering motor, upon steering manipulation, and to perform feedback control for operation of the steering motor by a difference between an actual steering manipulating force and a target steering manipulating force using the detected magnetic field.

The torque sensor module may include a torsion bar, which connects a shift lever connected to the steering shifter and a motor lever connected to the steering motor to each other and which is twisted due to a rotational difference between the shift lever and the motor lever upon steering manipulation, third permanent magnets respectively coupled to the shift lever and the motor lever, and a torque sensor PCB, which is fixed to a housing 830 fixed to the main body and which includes third Hall sensors, which faces the third permanent magnets, to detect change of a magnetic field caused by the rotational difference between the shifter lever and the motor lever upon steering manipulation.

The control module may include a main PCB fixed to the main body and a motor controller provided at the main PCB, the main PCB may be configured to send a signal to the motor controller, the torque sensor PCB may detect change of a magnetic field caused by a rotational difference between the shifter lever and the motor lever upon steering manipulation and transmits the change of the magnetic field to the main PCB: the main PCB may convert the change of the magnetic field into a torque value, may evaluate a difference between an actual steering manipulating force and a target steering manipulating force, and may transmit a signal corresponding to the difference to the motor controller, and the motor controller is configured to receive the signal from the main PCB and may perform feedback control for operation of the steering motor by a value corresponding to the difference.

The integrated control apparatus may further include a neutral-returning module, which is provided at the main body and the joystick lever in a state of being in contact therewith to serve to return the joystick lever to the neutral position using elastic force.

The neutral-returning module may include a support plate, which is fixed to the main body below the steering shifter and includes a concave recess formed therein, a bullet, which is provided at the lower end portion of the joystick lever that extends through the steering shifter and which is in contact with the recess, and a bullet spring provided at the joystick lever to elastically support the bullet.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
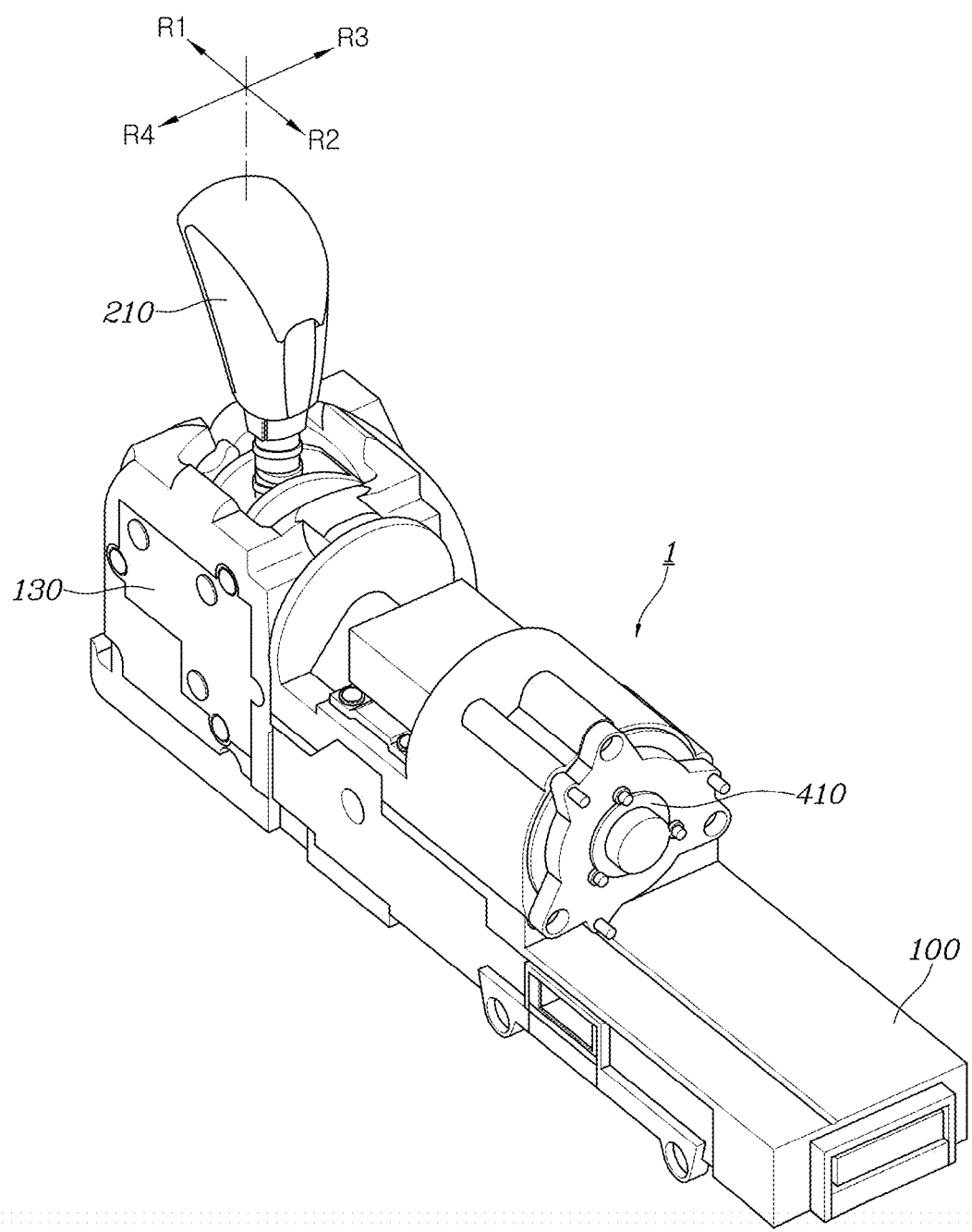
FIG. 1 is a perspective view of the integrated control apparatus according to an exemplary embodiment of the present disclosure.
Figure 2:
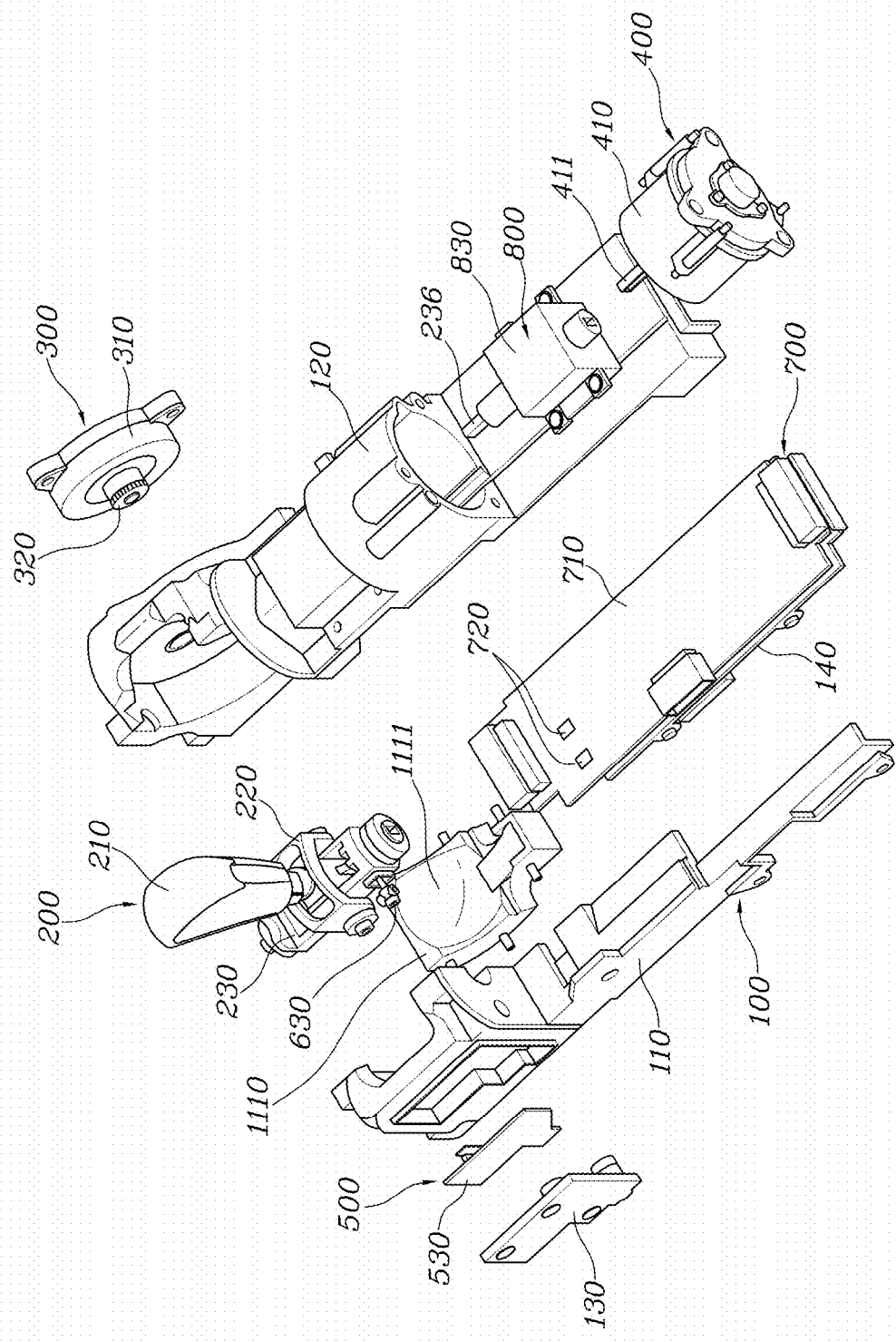
FIG. 2 is an exploded view of FIG. 1.
Figure 3:
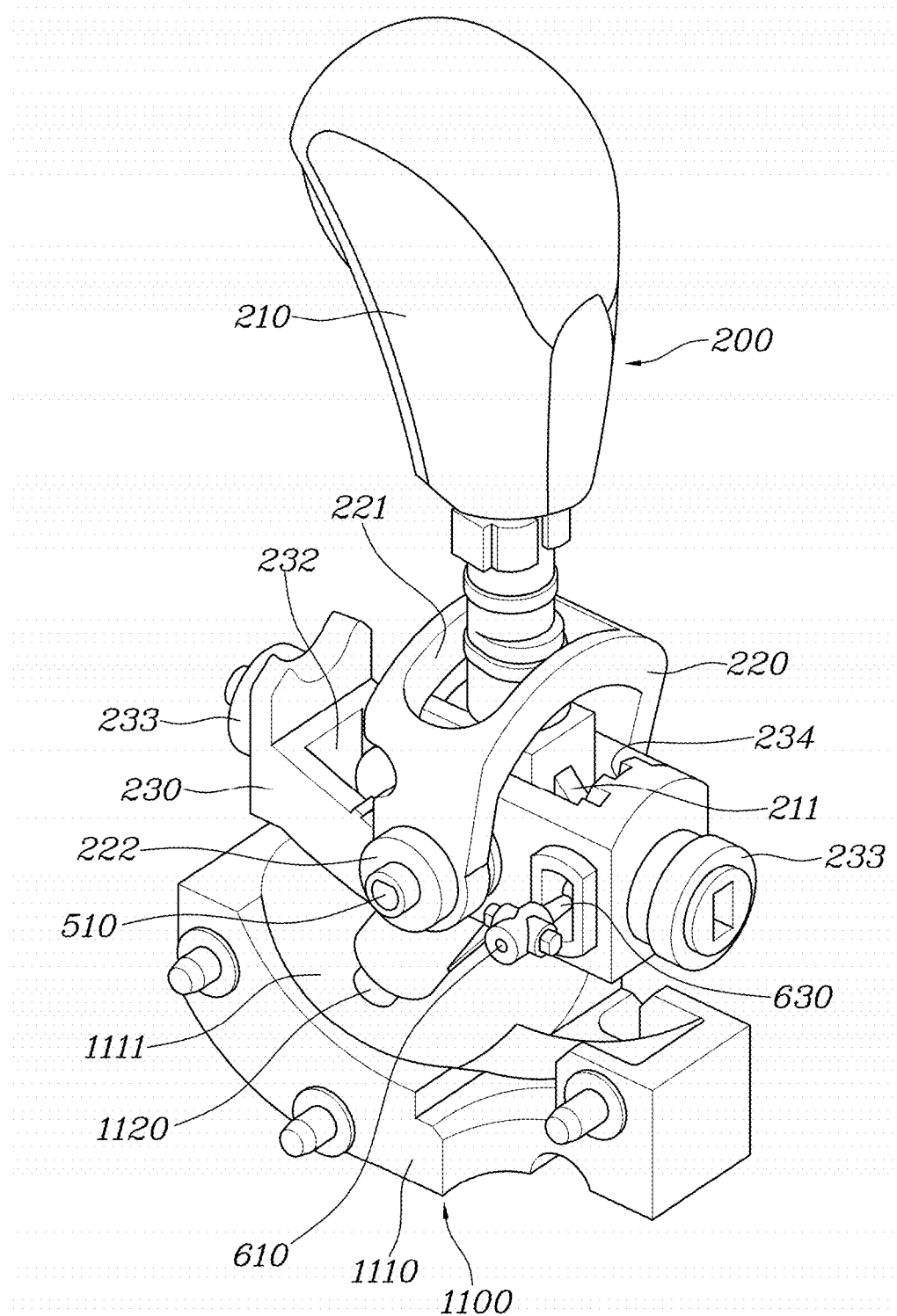
FIG. 3, FIG. 4, FIG. 5, FIG. 6, FIG. 7, FIG. 8, FIG. 9, FIG. 10, FIG. 11, FIG. 12 and FIG. 13 are views explaining a joystick lever module, an acceleration and deceleration actuator module, a steering actuator module, a first position sensor module, a second position sensor module, and a control module according to an exemplary embodiment of the present disclosure.
Figure 4:
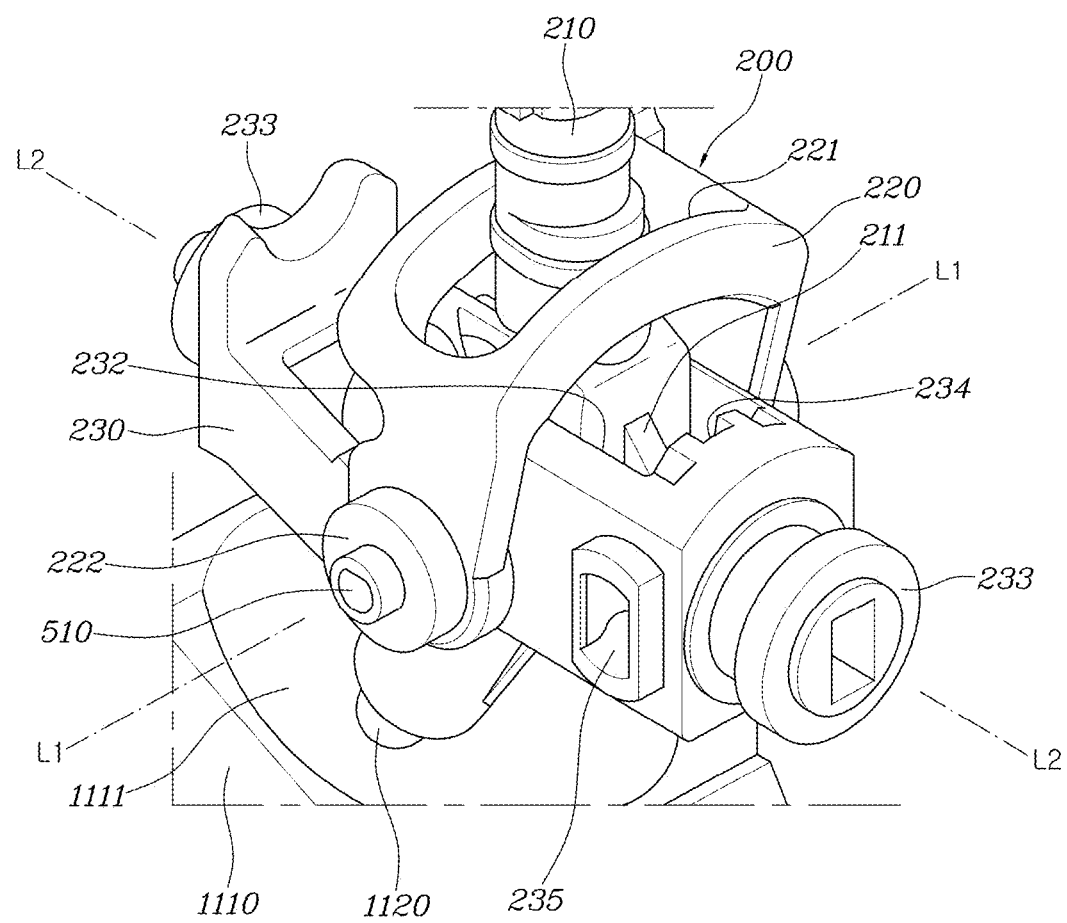
Figure 5:
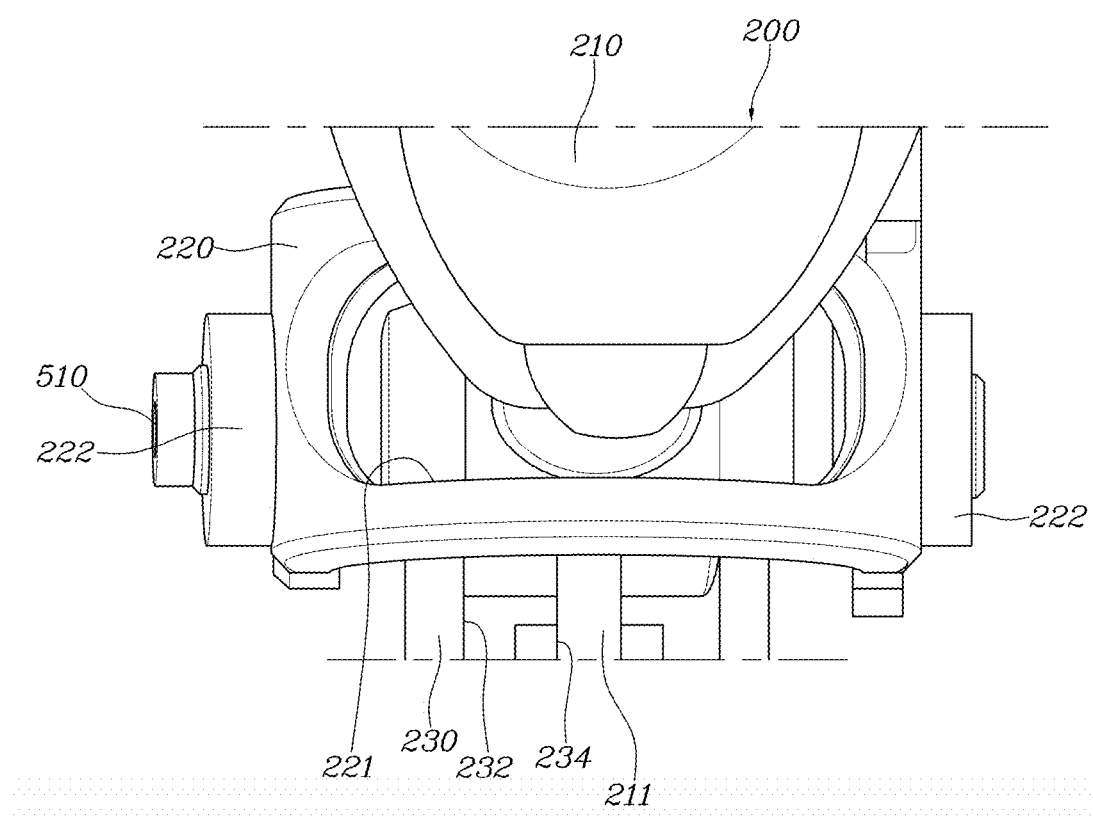
Figure 6:
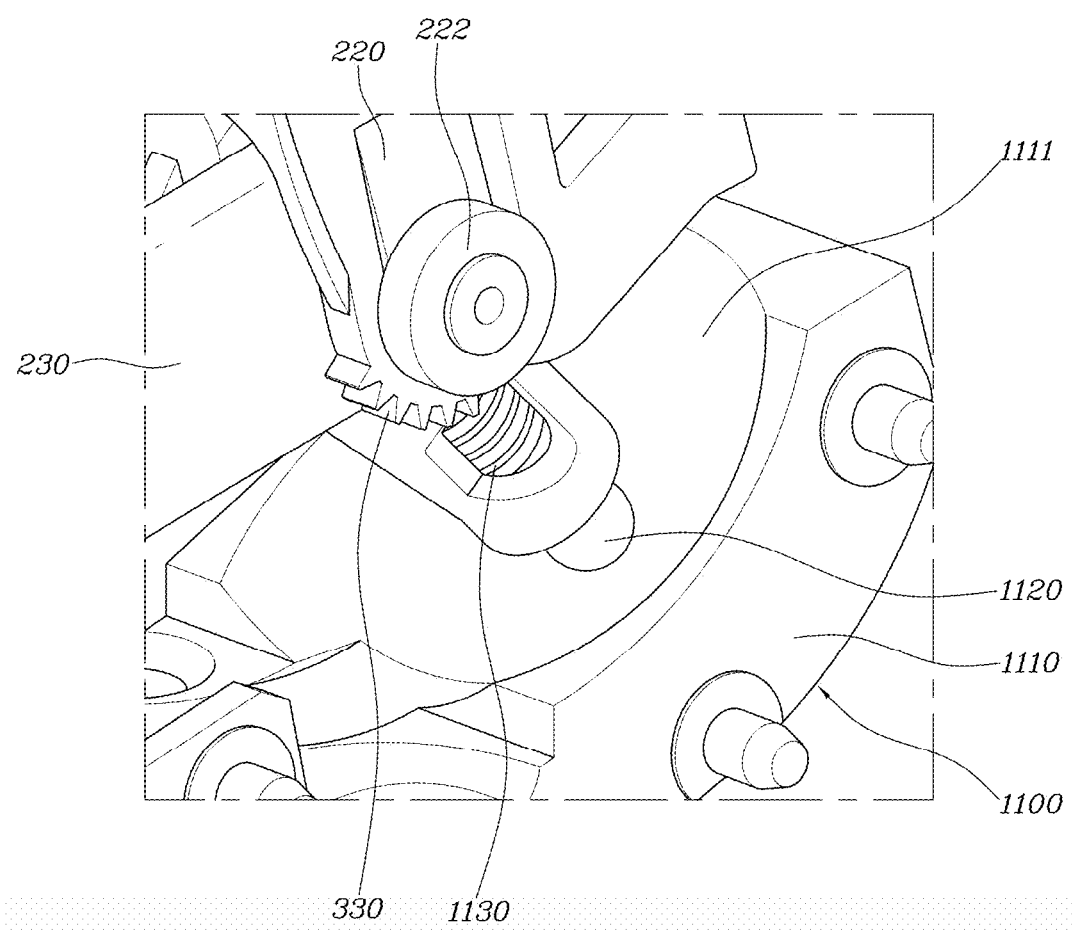
Figure 7:
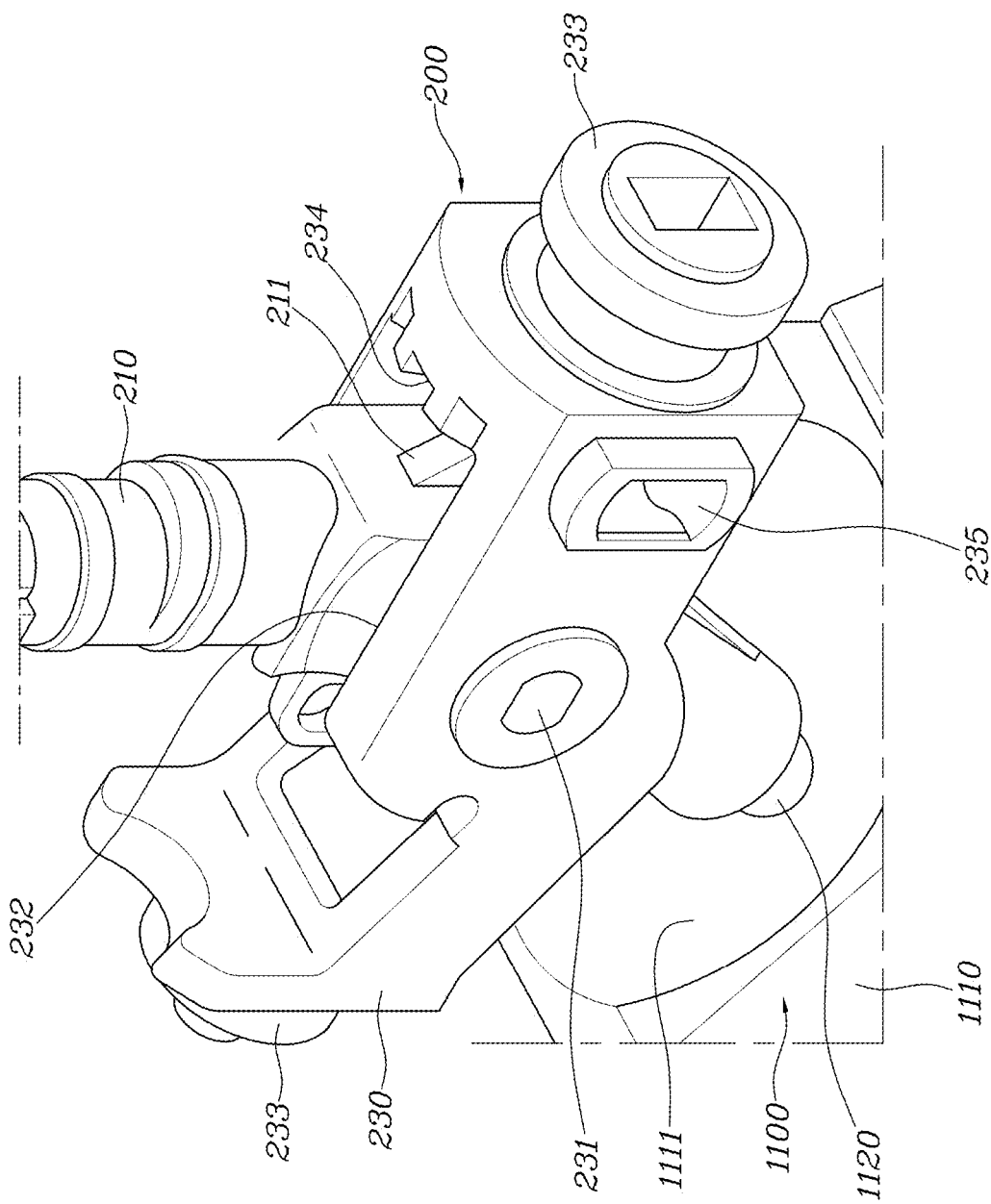
Figure 8:
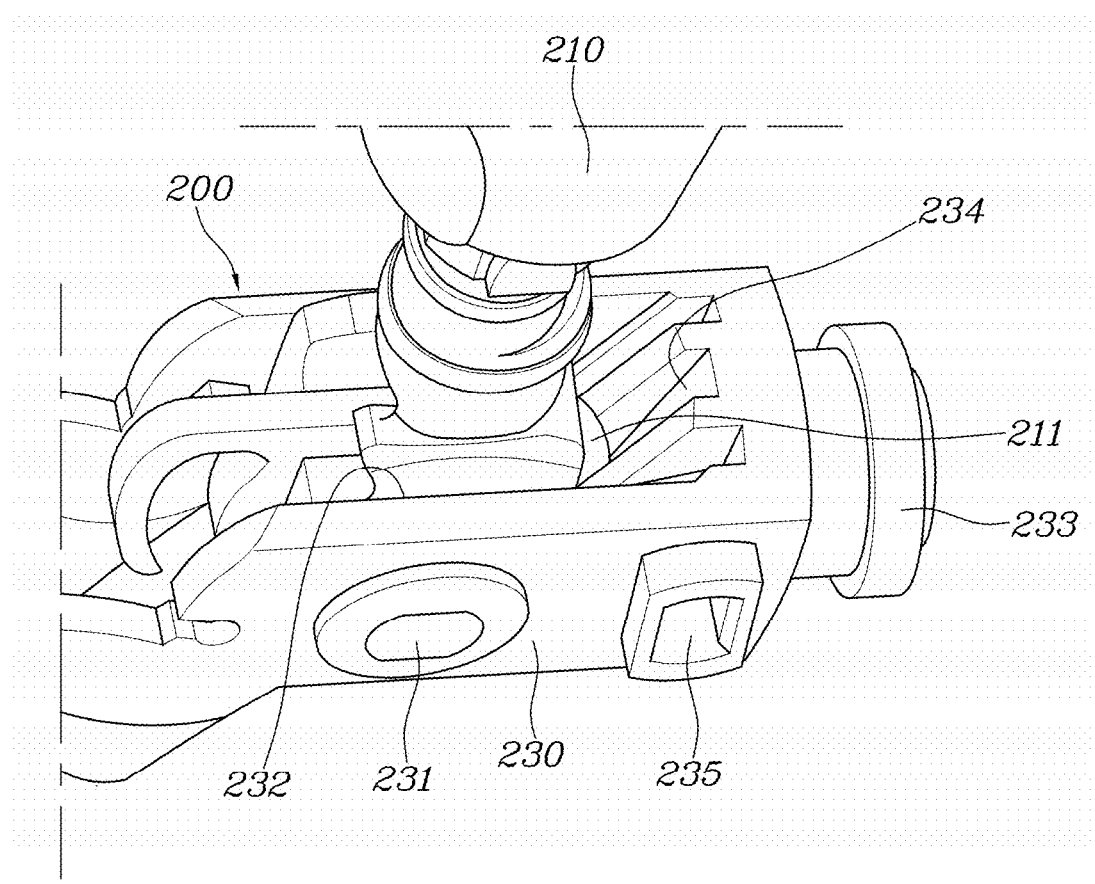
Figure 9:
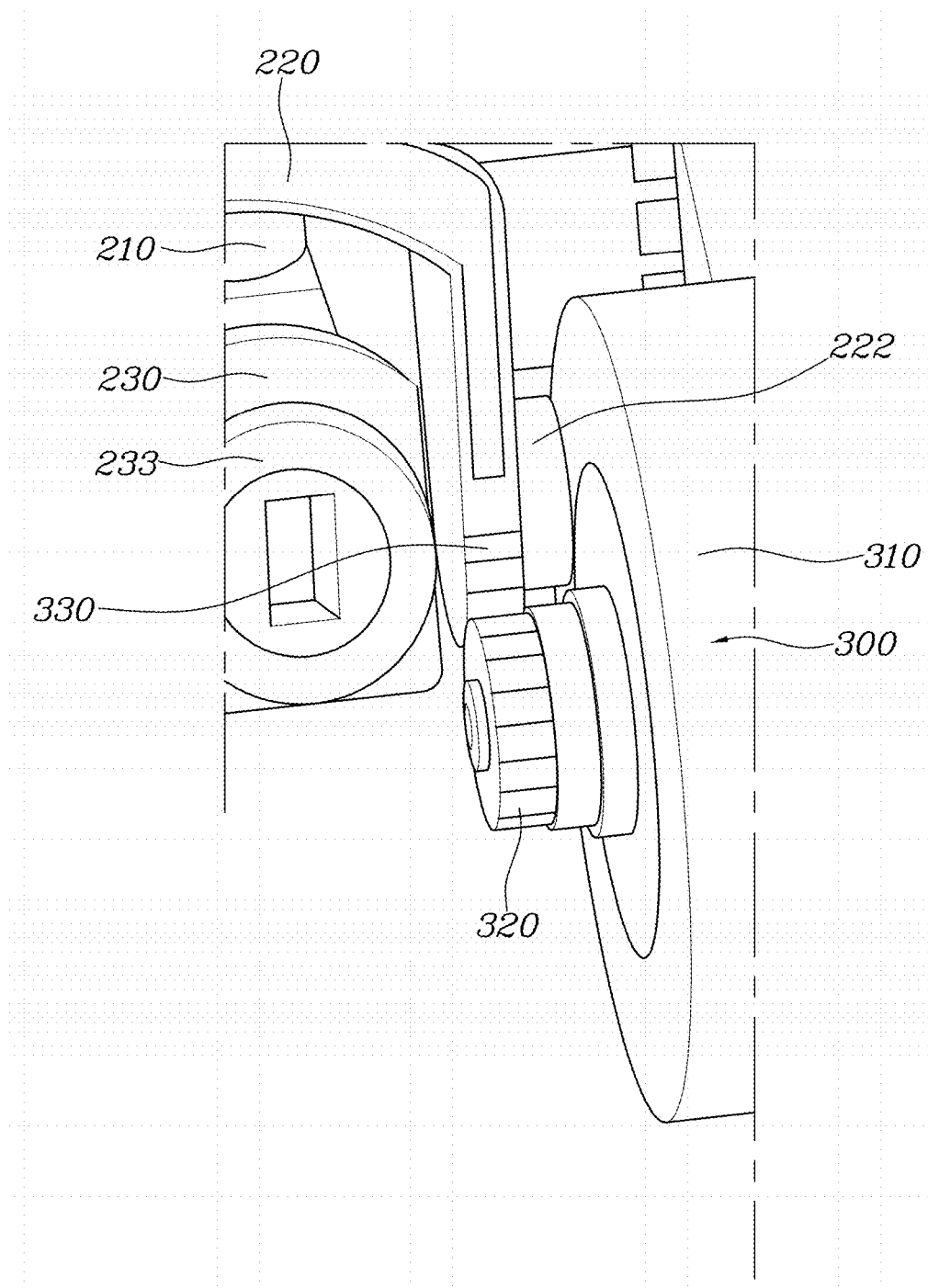
Figure 10:
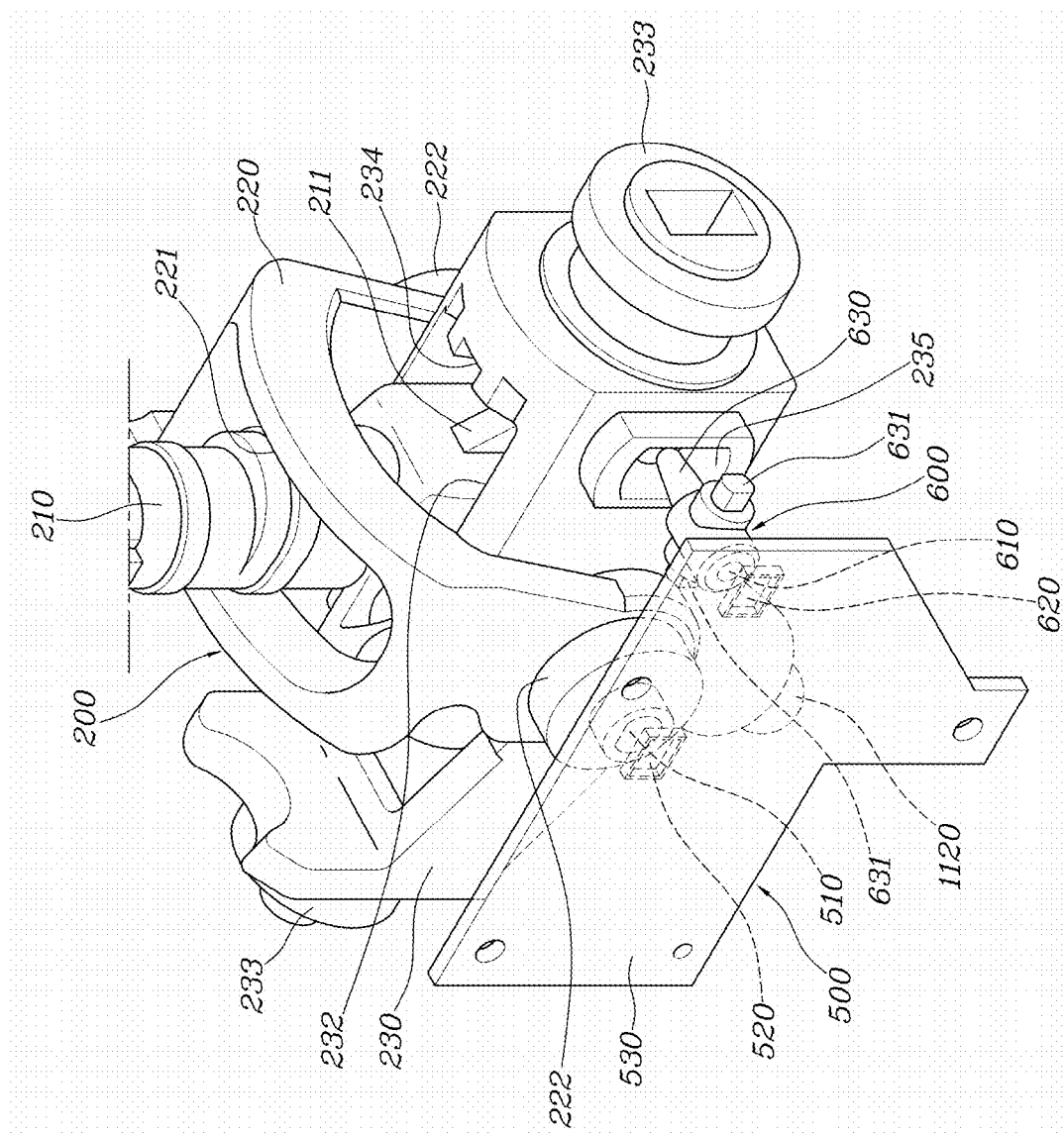
Figure 11:
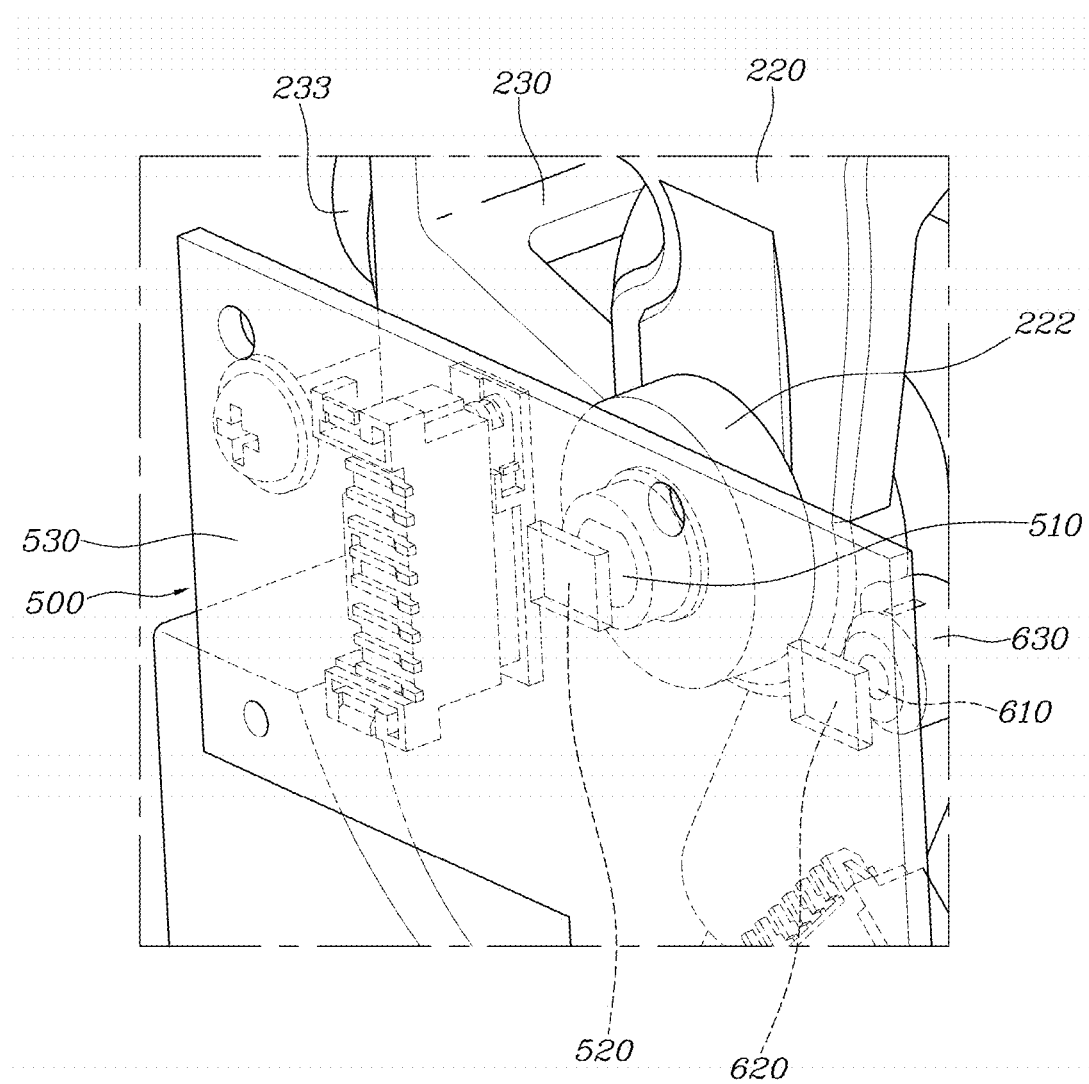
Figure 12:
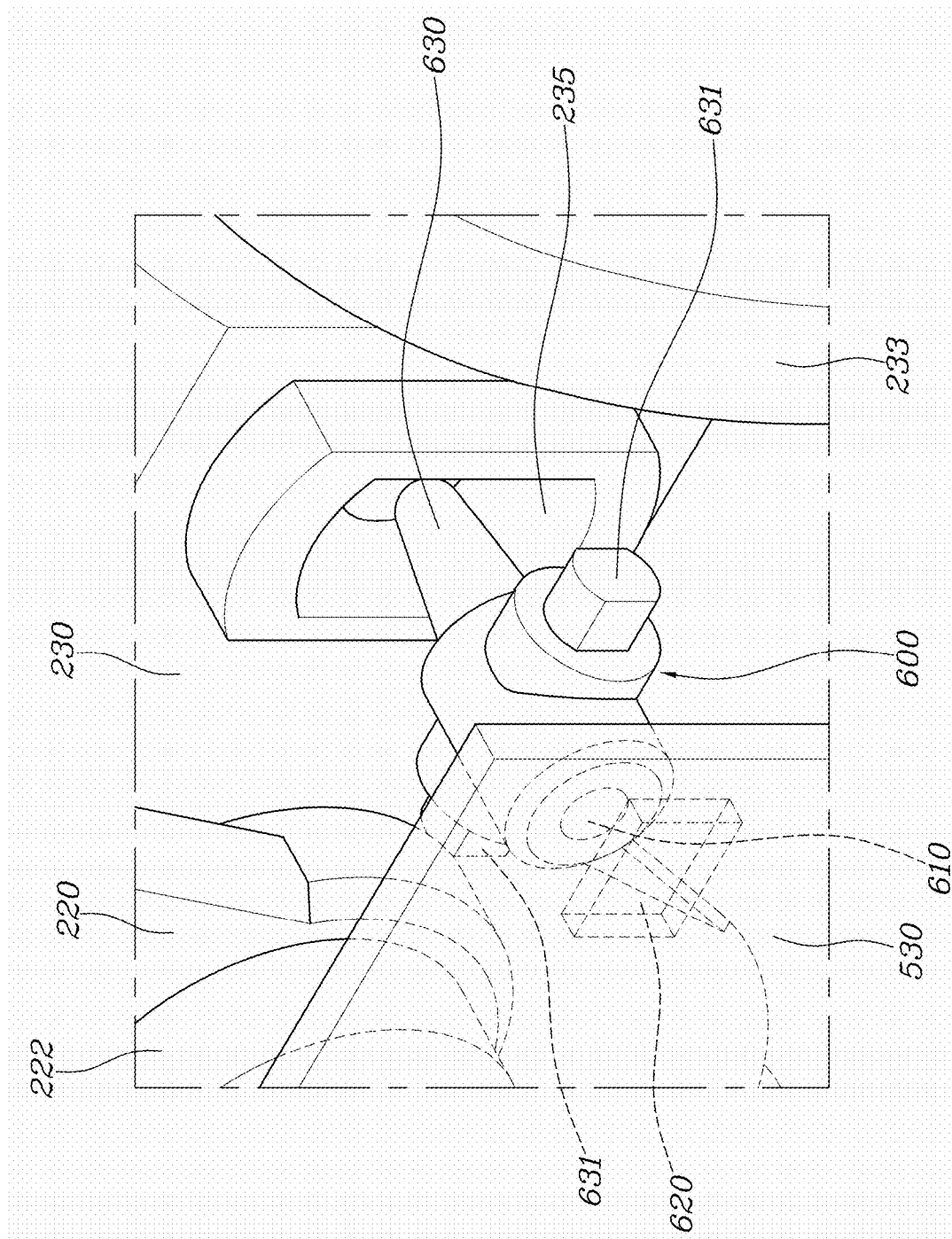
Figure 13:
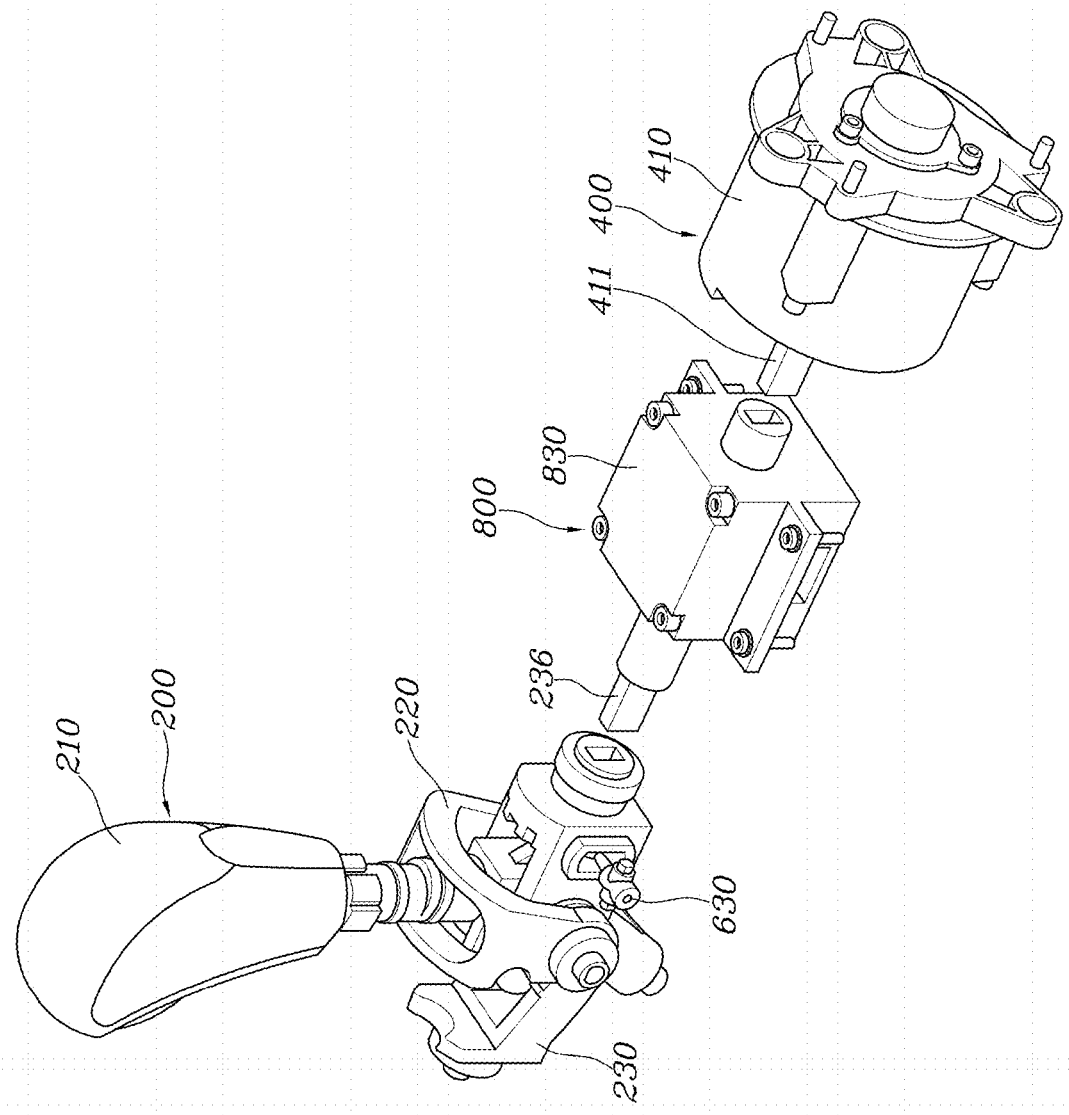

It may be understood that the appended drawings are not necessarily to scale, presenting a somewhat simplified representation of various features illustrative of the basic principles of the present disclosure. The predetermined design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

A description will now be provided in detail according to exemplary embodiments included herein, with reference to the accompanying drawings. For the sake of brevity of description with reference to the drawings, the same or equivalent components may be denoted by the same reference numbers, and a description thereof will not be repeated.

In general, suffixes such as "module" and "unit", when used in the following description, may be used to refer to elements or components for easy preparation of the specification. The use of such suffixes herein is merely intended to facilitate the description of the specification, and the suffixes do not imply any special meaning or function.

Furthermore, in the following description of embodiments included herein, when it is decided that a detailed description of known functions or configurations related to the present disclosure would make the subject matter of the present disclosure unclear, such detailed description is omitted.

The accompanying drawings are used to assist in easy understanding of various technical features, and it should be understood that the exemplary embodiments presented herein are not limited by the accompanying drawings. Accordingly, the present disclosure should be construed to extend to any alterations, equivalents, and substitutes, in addition to those which are set out in the accompanying drawings.

It will be understood that although the terms "first", "second", etc. may be used herein to describe various elements, these elements should not be construed as being limited by these terms. These terms are only used to distinguish one element from another.

It should be understood that, when an element is referred to as being "connected to" another element, there may be intervening elements present, or the element may be directly connected to the another element.

In contrast, it should be understood that, when an element is referred to as being "directly connected to" another element, there are no intervening elements present.

A singular representation may include a plural representation unless the context clearly indicates otherwise.

Terms such as "includes" or "has" used herein should be considered as indicating the presence of various features, numbers, steps, operations, elements, components or combinations thereof included in the specification, but it should be understood that the presence or addition of one or more other features, numbers, steps, operations, elements, components or combinations thereof is not excluded.

Furthermore, the terms "unit" and "control unit" forming portion of the names of the motor control unit (MCU) and the hybrid control unit (HCU) are merely terms that are widely used in the naming of a controller for controlling a specific function of a vehicle, and should not be construed as meaning a generic function unit.

For example, to control the function peculiar thereto, each controller may include a communication device, which communicates with other controllers or sensors, a memory, which stores therein an operating system, logic commands, and input/output information, and one or more processors, which perform determinations, calculations, and decisions necessary for control of the function peculiar thereto.

Hereinafter, an integrated control apparatus for an autonomous vehicle according to various exemplary embodiments of the present disclosure will be described in detail with reference to the accompanying drawings.

Generally, an autonomous vehicle is provided with an integrated control apparatus which is directly manipulated by a user (a manager) to drive the vehicle in a manual driving mode.

The integrated control apparatus may be manipulated by a user while being gripped by his or her hand or hands.

As illustrated in FIGS. 1 to 19, an integrated control apparatus 1 according to an exemplary embodiment of the present disclosure includes a main body 100 defining the external body of the apparatus, a joystick lever module 200 rotatably coupled to the main body 100 and manipulated by a user for acceleration, deceleration and steering of a vehicle, an acceleration and deceleration actuator module 300 coupled to the main body 100 and connected to the joystick lever module 200 for power transmission, the acceleration and deceleration actuator module 300 being configured to generate reactive force when the joystick lever module 200 is rotated to perform acceleration or deceleration and to restore the joystick lever module 200 to the neutral position using the generated reactive force upon manipulation, a steering actuator module 400 coupled to the main body 100 and connected to the joystick lever module 200 for power transmission, the steering actuator module 400 being configured to generate reactive force when the joystick lever module 200 is rotated to perform steering and to restore the joystick lever module 200 to the neutral position using the generated reactive force upon manipulation, a first position sensor module 500 provided at the main body 100 and the joystick lever module 200 to detect the acceleration and deceleration positions of the joystick lever module 200, a second position sensor module 600 provided at the main body 100 and the joystick lever module 200 to detect the steering position of the joystick lever module 200, and a control module 700 configured to receive signals from the first and second position sensor modules 500 and 600 to generate signals pertaining to acceleration, deceleration, and a steering of the vehicle and to control operations of the acceleration and deceleration actuator module 300 and the steering actuator module 400.

When the integrated control apparatus 1 is provided at an autonomous vehicle, the main body 100 may be fixed to a specified position in the passenger compartment of the vehicle so as not to be moved, and may be moved to a user's desired position and be used when necessary.

The main body 100 includes a left body 110 and a right body 120, which are coupled to each other to be separable.

The joystick lever module 200 includes a joystick lever 210 configured to be gripped and manipulated by a user, an acceleration and deceleration shifter 220 through which the lower end portion of the joystick lever 210 extends and in which a first hole 221 is bilaterally formed to allow rightward and leftward rotation of the joystick lever 210, the acceleration and deceleration shifter 220 being coupled at two end portions thereof to the main body 100 via first bearings 222 to be rotatable forwards and backwards thereof, and a steering shifter 230 which is coupled via a hinge 231 to lower end portion of the joystick lever 210 that extends through the acceleration and deceleration shifter 220 and in which a second hole 232 is formed in forward and backward directions to allow forward and backward rotation of the joystick lever 210 about the hinge 231, the steering shifter 230 being coupled at the front and rear end portions thereof to the main body 100 via second bearings 233 to be rotatable rightward and leftward.

The upper end portion of the joystick lever 210 is provided with a knob which enables a user to grip the joystick lever 210, and the lower end portion of the joystick lever 210 projects downwards from the steering shifter 230 through the first hole 221 in the acceleration and deceleration shifter 220 and the second hole 232 in the steering shifter 230.

The acceleration and deceleration shifter 220 includes an inverted "U" shape which opens downwards, and the first hole 221 is bilaterally formed in the upper portion of the acceleration and deceleration shifter 220 to allow the joystick lever 210 to be rotated rightward and leftward along the first hole 221.

The first bearings 222 are respectively coupled to the two lateral end portions of the acceleration and deceleration shifter 220, and are coupled to the main body 100. Consequently, when the joystick lever 210 is manipulated forwards and backwards by a user, the acceleration and deceleration shifter 220 is rotated forwards and backwards about the first bearings 220 together with the joystick lever 210.

The steering shifter 230 is positioned in the internal space in the acceleration and deceleration shifter 220, and extends forwards and backwards thereof. The second hole 232 is formed through the upper and lower surfaces of the steering shifter 230 and extends forwards and backwards to allow the joystick lever 210 to be rotated forwards and backwards therethrough.

The second bearings 233 are respectively coupled to the front and rear end portions of the steering shifter 230, and are coupled to the main body 100. Consequently, when the joystick lever 210 is manipulated rightward and leftward by a user, the steering shifter 230 is rotated rightward and leftward about the second bearings 233 together with the joystick lever 210.

The axis, which extends through the centers of the two first bearings 222 coupled to the acceleration and deceleration shifter 220, becomes the rotation axis L1 of the acceleration and deceleration shifter 220, and the axis, which extends through the centers of the two second bearings 233 coupled to the steering shifter 230, becomes the rotation axis L2 of the steering shifter 230.

According to an exemplary embodiment of the present disclosure, the lower end portion of the joystick lever 210 is provided with a guide protrusion 211 which projects outwards.

The guide protrusion 211 is formed to be positioned in the second hole 232 in the steering shifter 230, and projects rearwards from the rear surface of the lower end portion of the joystick lever 210.

The second hole 232 in the steering shifter 230 is provided with a guide groove 234 which is brought into contact with the guide protrusion 211.

The guide groove 234 is formed as a recess in the rear surface of the second hole 232, and the guide protrusion 211 is inserted into the guide groove 234. The guide groove 234 is formed to vertically extend in a direction in which the guide protrusion 211 is moved when the joystick lever 210 is rotated forwards and backwards thereof.

Accordingly, the guide protrusion 211 and the guide groove 234 are configured to guide rotation of the joystick lever 210 in forward and backward directions when the joystick lever 210 is rotated forwards and backwards about the hinge 231.

The joystick lever 210 may be manipulated to be rotatable rightward and leftward and forwards and backwards while being gripped by a user.

Acceleration and deceleration of the vehicle are performed when the joystick lever 210 is rotated forwards and backwards thereof, and steering is performed when the joystick lever 210 is rotated rightward and leftward.

When the joystick lever 210 is manipulated for acceleration or deceleration, the acceleration and deceleration shifter 220 is rotated forwards and backwards together with the joystick lever 210. When the joystick lever 210 is manipulated for steering, the steering shifter 230 is rotated rightward and leftward together with the joystick lever 210.

Because there is no direct connecting structure between the acceleration and deceleration shifter 220 and the steering shifter 230, the acceleration and deceleration shifter 220 is not interlocked with the steering shifter 230 when the joystick lever 210 is rotated rightward and leftward and forwards and backwards thereof.

When the joystick lever 210 is rotated forwards by a user (in the direction R1 in FIG. 1), a main Printed Circuit Board (PCB) 710, which is provided in the main body 100, generates a signal pertaining to acceleration of the vehicle. Meanwhile, when the joystick lever 210 is rotated backwards by a user (in the direction R2 in FIG. 1), the main PCB 710 generates a signal pertaining to deceleration of the vehicle.

Alternatively, when the joystick lever 210 is rotated forwards by a user, deceleration of the vehicle may be performed. Meanwhile, when the joystick lever 210 is rotated backwards, acceleration of the vehicle may be performed.

Furthermore, when the joystick lever 210 is rotated rightwards or leftwards (in the direction R3 or R4 in FIG. 1), the main PCB 710 generates a signal pertaining to steering of the vehicle.

In another exemplary embodiment of the present disclosure, when the joystick lever 210 is rotated forwards, acceleration in forward movement of the vehicle may be performed. Meanwhile, when the joystick lever 210, which has been rotated forwards, is returned to the neutral position, deceleration in forward movement of the vehicle may be performed.

Furthermore, when the joystick lever 210 is rotated backwards, acceleration in backward movement of the vehicle may be performed. Meanwhile, when the joystick lever 210, which has been rotated backwards, is returned to the neutral position, deceleration in backward movement of the vehicle may be performed.

This construction may include the same concept as a pedal technology in which only one pedal is used for acceleration and deceleration.

When there is no manipulating force applied to the joystick lever 210, the joystick lever 210 is positioned at the intermediate position without being rotated right and leftward and forwards and backwards thereof. At the instant time, the position of the joystick lever 210 may be defined as a neutral position.

Accordingly, when the user removes the manipulation force applied to the joystick lever 210 in the state in which the joystick lever 210 is rotated for acceleration, deceleration or steering, the joystick lever 210 is returned to the neutral position at which the joystick lever 210 was in the rest state before rotation.

In the case in which a vehicle is set to perform deceleration when the joystick lever 210 is returned to the neutral position, the number of times the joystick lever 210 is manipulated to perform deceleration is reduced, greatly alleviating driver's degree of fatigue, and furthermore there is no need to perform braking manipulation immediately before cornering after traveling at high speed, facilitating manipulation of the joystick lever 210 during cornering.

Generally, the speed of a vehicle varies within a wide range when the vehicle is accelerated or decelerated by manipulation of the joystick lever 210. Accordingly, it is possible to perform rapid acceleration and rapid braking, and the speed variation within a wide range may be executed in increments of, for example, 5 km/h or 10 km/h each time.

In the case in which acceleration or deceleration (braking) of a vehicle is performed by manipulation of the joystick lever 210, there is no limitation on the upper limit of speed to allow rapid acceleration and rapid braking. As a result, it is possible to exert the maximum acceleration performance or the maximum braking performance, and it is possible to perform acceleration or deceleration at 100% of the maximum output of the vehicle.

When the joystick lever 210 is manipulated forwards and backwards thereof, the first position sensor module 500 detects the manipulation of the joystick lever 210, and transmits the result of detecting to the main PCB 710 via a motor controller 720. Accordingly, a control signal of the main PCB 710 is transmitted to a vehicle controller 910, and the vehicle controller 910 sends the control signal to a driving system, a braking system, and a steering system to perform at least one of acceleration, braking or steering of the vehicle.

The acceleration and deceleration actuator module 300 according to an exemplary embodiment of the present disclosure includes an acceleration and deceleration motor 310 fixed to the main body 100, a drive gear 320 rotatably coupled to the acceleration and deceleration motor 310, and a follower gear 330 provided at the acceleration and deceleration shifter 220 and engaged with the drive gear 320.

The acceleration and deceleration motor 310 is fixed to the main body 100 in a state of being spaced from the acceleration and deceleration shifter 220 in one direction thereof.

The drive gear 320 is coupled to the acceleration and deceleration motor 310, and the follower gear 330 is integrally formed with one end portion of the acceleration and deceleration shifter 220 that faces the acceleration and deceleration motor 310. Accordingly, by the engagement between the drive gear 320 and the follower gear 330, power transmission between the acceleration and deceleration shifter 220 and the acceleration and deceleration motor 310 is allowed.

The first position sensor module 500 according to an exemplary embodiment of the present disclosure includes a first permanent magnet 510 coupled to the acceleration and deceleration shifter 220, and a position sensor PCB 530 fixed to the main body 100 and including a first Hall sensor 520 which faces the first permanent magnet 510, the position sensor PCB 530 being configured to detect the acceleration position and the deceleration position of the joystick lever 210 based on change of magnetic flux attributable to change of position of the first permanent magnet 510 when the acceleration and deceleration shifter 220 is rotated.

The first permanent magnet 510 is coupled to a protrusion, which extends through the center portion of the first bearing 222 at one end portion of the acceleration and deceleration shifter 220, and the first Hall sensor 520 of the position sensor PCB 530 is positioned to face the first permanent magnet 510.

When the joystick lever 210 is manipulated and rotated forwards and backwards by a user, the first position sensor module 500 may detect the position of the joystick lever 210 based on change of magnetic flux, and may be configured to generate an acceleration signal or a deceleration signal under the control of the main PCB 710.

The control module 700 according to an exemplary embodiment of the present disclosure includes the main PCB 710 fixed to the main body 100, and the motor controller 720 provided at the main PCB 710. The main PCB 710 is configured to transmit a signal to the motor controller 720.

Figure 19:
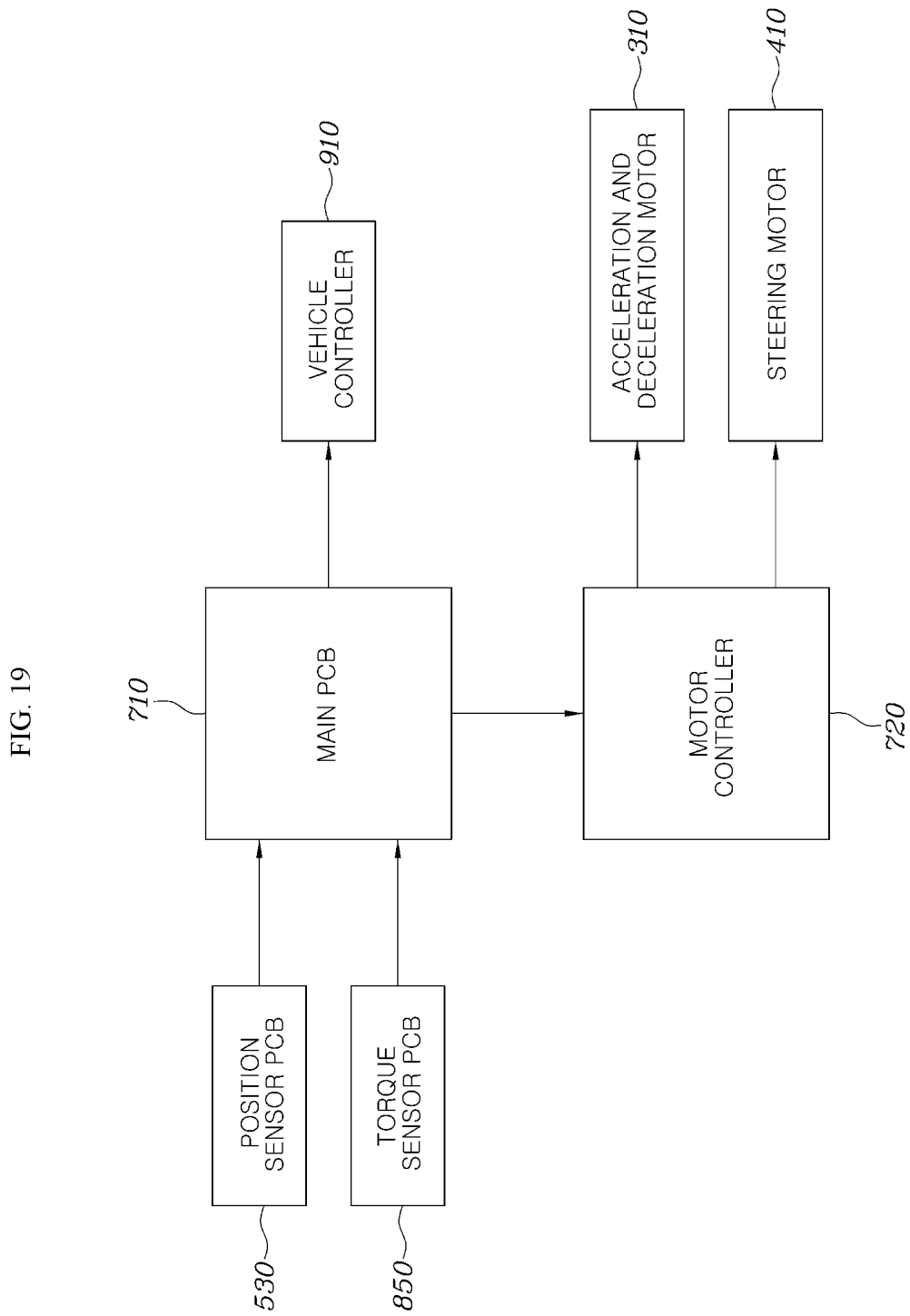
FIG. 19 is a block diagram schematically illustrating a signal circuit of the integrated control apparatus according to an exemplary embodiment of the present disclosure.

As illustrated in FIG. 19, the signal of the position sensor PCB 530 is transmitted to the main PCB 710, and the motor controller 720 receives the signal from the main PCB 710 to control operation of the acceleration and deceleration motor 310.

When the joystick lever 210 is manipulated and rotated forward or backward by a user, the first position sensor module 500 detects the rotation of the joystick lever 210 based on change of magnetic flux and transmits the result of detecting to the main PCB 710, and the main PCB 710 generates a signal pertaining to acceleration or deceleration of the vehicle and transmits the signal to the vehicle controller 910.

The main PCB 710 generates a signal pertaining to rotation torque of the acceleration and deceleration motor 310 corresponding to position of the joystick lever 210 and transmits the signal to the motor controller 720, and the motor controller 720 is configured to perform control to drive the acceleration and deceleration motor 310. The power of the acceleration and deceleration motor 310 is transmitted to the joystick lever 210 via the drive gear 320 and the follow gear 330, and thus reactive force (manipulating force) corresponding to the accelerating or decelerating manipulation is generated in the joystick lever 210, enabling the user to recognize the reactive force.

When the manipulating force of the user, which is applied to the joystick lever 210 to rotate the joystick lever 210 forward or backward, is removed, the joystick lever 210 may be returned to the neutral position due to the reactive force generated by the acceleration and deceleration motor 310.

According to an exemplary embodiment of the present disclosure, a side cover 130 is coupled to one side of the main body 100 to cover and protect the position sensor PCB 530.

The side cover 130 may be fixedly coupled to a side surface of the left body 110.

Furthermore, a lower cover 140 is coupled to the lower side of the main body 100 to cover and protect the main PCB 710.

The steering actuator module 400 according to an exemplary embodiment of the present disclosure is fixed to the main body 100, and includes a steering motor 410 connected to the steering shifter 230 for power transmission.

The steering motor 410 is fixed to the right body 120, and is connected to the steering shifter 230 for power transmission.

A user rotates the joystick lever 210 rightward or leftward to perform a steering operation. When the manipulating force, which is applied for steering operation, is removed, the joystick lever 210 is returned to the neutral position, i.e., the position before rotation of the joystick lever 210.

Figure 14:
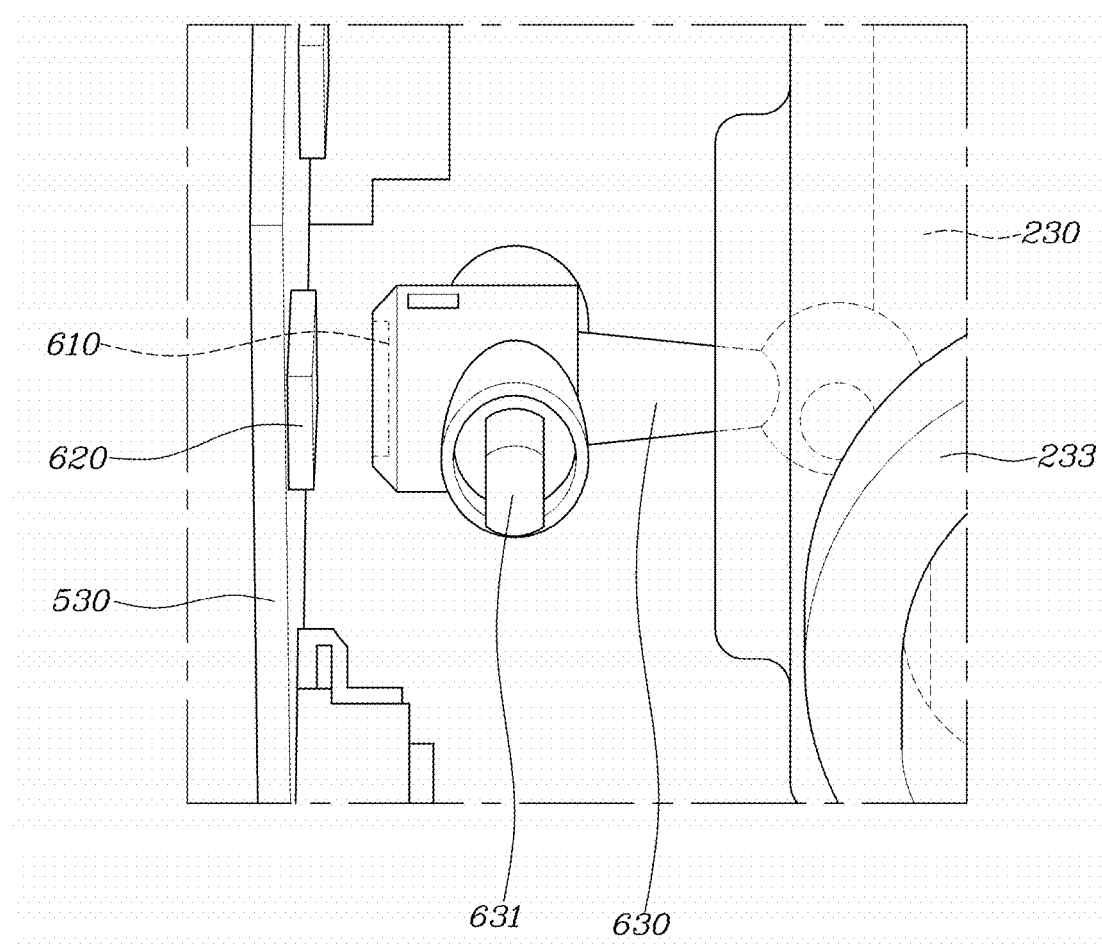
FIG. 14 is a view exemplarily illustrating the state in which a joystick lever according to an exemplary embodiment of the present disclosure is positioned at the neutral position.
Figure 15:
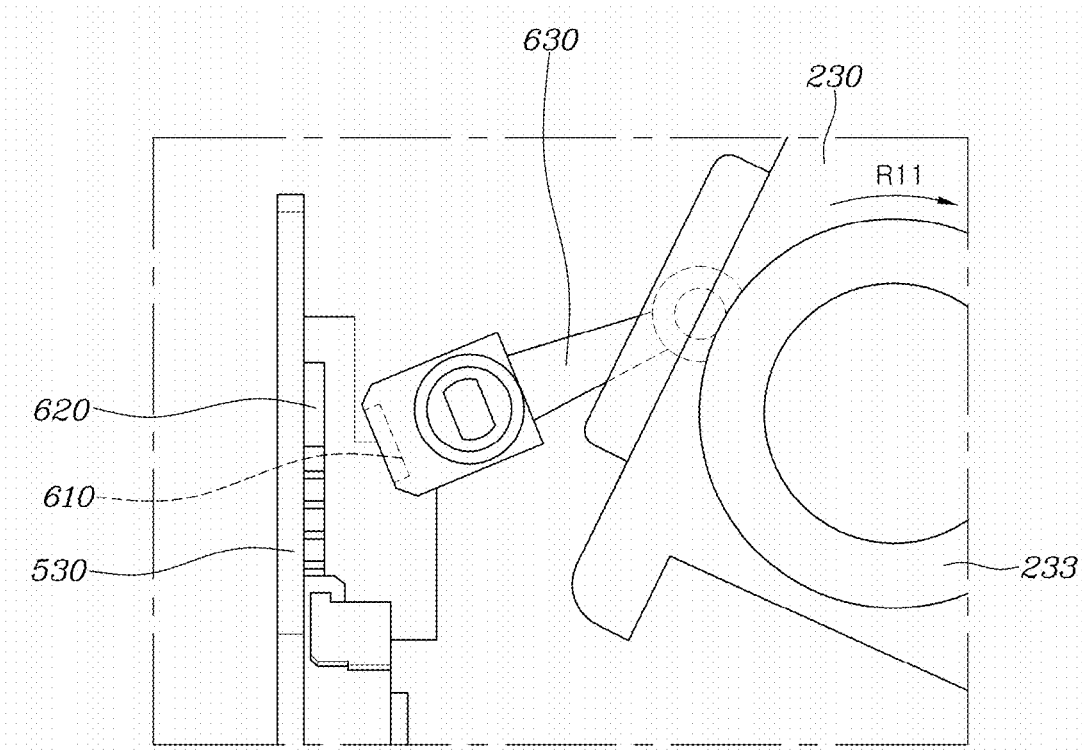
FIG. 15 and FIG. 16 are views exemplarily illustrating the state in which the joystick lever is rotated rightward and leftward for steering operation from the state shown in FIG. 14.
Figure 16:
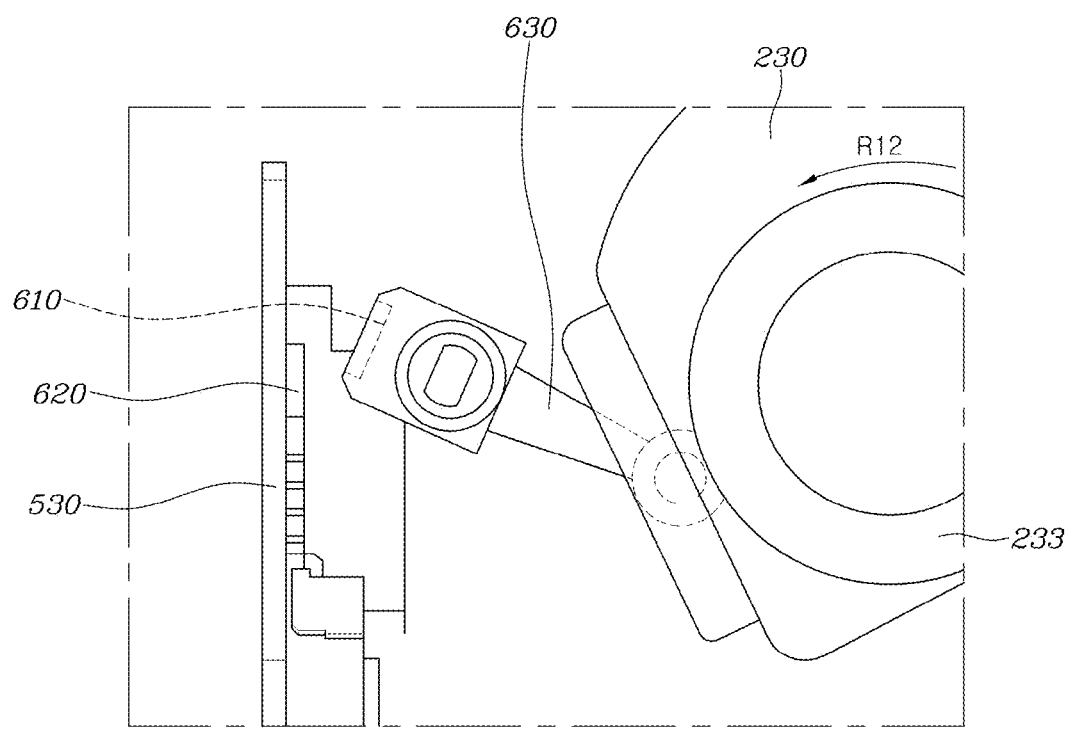

FIG. 14 illustrates the state in which the joystick lever 210 is positioned at the neutral position thereof. FIG. 15 and FIG. 16 illustrate the state after the steering manipulation of the joystick lever 210 is performed.

When the steering manipulation of the joystick lever 210 is performed, the steering shifter 230 is rotated about the second bearings 233 together with the joystick lever 210.

The second position sensor module 600 according to an exemplary embodiment of the present disclosure includes a second permanent magnet 610 connected to the steering shifter 230, and a second Hall sensor 620 provided at the position sensor PCB 530 to face the second permanent magnet 610. The position sensor PCB 530 is further configured for detecting the steering position of the joystick lever 210 based on change of magnetic flux attributable to change of position of the second permanent magnet 610 when the steering shifter 230 is rotated.

When the joystick lever 210 is manipulated and rotated right and leftward for a steering operation by a user, the second permanent magnet 610 is moved and changed in position thereof. At the instant time, the position sensor PCB 530 detects change of magnetic flux attributable to the change of position of the second permanent magnet 610 through the second Hall sensor 620 and thus detects the steered position of the joystick lever 210.

The present disclosure is characterized in that the first position sensor module 500 and the second position sensor module 600 share the single position sensor PCB 530 and the single position sensor PCB 530 is provided with the first Hall sensor 520 and the second Hall sensor 620, which are spaced from each other.

In other words, the exemplary embodiment of the present disclosure is advantageous in that acceleration, deceleration and steering positions of the joystick lever 210 are detected using the single position sensor PCB 530 provided with the first Hall sensor 520 and the second Hall sensor 620, reducing the number of position sensor PCBs 530, minimizing manufacturing cost, and facilitating layout.

The exemplary embodiment of the present disclosure is characterized in that the second permanent magnet 610 is coupled to a ball guide 630.

In other words, the second position sensor module 600 further includes the ball guide 630 to which the second permanent magnet 610 is coupled and which is connected to the steering shifter 230.

The ball guide 630 includes the form of a rod which extends laterally. One end portion of the ball guide 630 is formed to include a shape of a sphere and is in contact with the steering shifter 230, and the other end portion of the ball guide 630 extends in a lateral direction of the steering shifter 230 and is coupled to the second permanent magnet 610.

The ball guide 630 extends in a direction orthogonal to one side of the position sensor PCB 530. The spherical ball portion of the one end portion of the ball guide 630 is in contact with the steering shifter 230, and the second permanent magnet 610 coupled to the other end portion of the ball guide 630 is disposed to face the second Hall sensor 620.

The steering shifter 230 is provided in one lateral side thereof with a through hole 235 through which the ball guide 630 extends and which extends vertically.

The ball guide 630 is provided with a pair of protrusions 631 which project forwards and backwards thereof. Lubricant, such as grease, is applied to the protrusions 631, and the protrusions 631 are coupled to the main body 100 to be rotatable rightward and leftward.

The protrusions 631 may be integrally formed with the ball guide 630, and may be positioned between the position sensor PCB 530 and the steering shifter 230.

The ball guide 630 is rotated in a direction opposite to the rotation direction of the steering shifter 230 by the protrusions 631, which are rotatably coupled to the main body 100.

FIG. 14 illustrates the state in which the joystick lever 210 is positioned at the neutral position thereof. FIG. 15 illustrates the state in which the joystick lever 210 is rotated to perform a steering operation.

When the steering shifter 230 is rotated in a clockwise direction R11 from the neutral position shown in FIG. 14, the ball guide 630 is rotated counterclockwise about the protrusions 631. Meanwhile, when the steering shifter 230 is rotated in a counterclockwise direction R12 from the neutral position shown in FIG. 14, the ball guide 630 is rotated clockwise about the protrusions 631.

The steering shifter 230 is positioned in the internal space in the acceleration and deceleration shifter 220, and is rotated rightward and leftward when the joystick lever 210 is manipulated. The ball guide 630 is configured to increase the amount of movement of the second permanent magnet 610 when the steering shifter 230 is rotated.

Consequently, change of magnetic flux is increased, enabling the position sensor 530 to more accurately detect the steered position of the joystick lever 210.

In the exemplary embodiment of the present disclosure, the position sensor PCB 530 is disposed at one side of the rotation axis L1, and the rotation axis L1 of the acceleration and deceleration shifter 220 and the rotation axis L2 of the steering shifter 230 are disposed to be orthogonal to each other. The ball guide 630 is disposed at one side based on the rotation axis L2 of the steering shifter 230 so that the end portion of the ball guide 630, to which the second permanent magnet 610 is coupled, faces the position sensor PCB 530. The ball guide 630 is disposed to be parallel to the rotation axis L1 of the acceleration and deceleration shifter 220 when the joystick lever 210 is not manipulated.

The control module 700 according to an exemplary embodiment of the present disclosure includes the main PCB 710 fixed to the main body 100, and the motor controller 720 provided at the main PCB 710. The main PCB 710 is configured to transmit a signal to the motor controller 720.

As illustrated in FIG. 19, the signal of the position sensor PCB 530 may be transmitted to the main PCB 710, and the motor controller 270 may receive the signal from the main PCB 710 to control the operation of the steering motor 410.

Furthermore, the signal of the position sensor PCB 530 may be transmitted to the main PCB 710, and the main PCB 710 may transmit a signal pertaining to steering to the vehicle controller 910.

When the joystick lever 210 is manipulated and rotated for a steering operation, the second position sensor module 600 detects the rotation of the joystick lever 210 based on change of magnetic flux, and transmits the result of detecting to the main PCB 710 via the motor controller 720. Accordingly, the main PCB 710 generates a signal pertaining to steering of the vehicle and transmits the signal to the vehicle controller 910.

Furthermore, the main PCB 710 generates a signal pertaining to rotation torque of the steering motor 410 corresponding to position of the joystick lever 210 and transmits the signal to the motor controller 720. Subsequently, the steering motor 410 is driven under the control of the motor controller 720, and the power of the steering motor 410 is transmitted to the joystick lever 210 via the steering shifter 230, with the result that reactive force (manipulating force) with respect to the steering manipulation is generated in the joystick lever 210, enabling a user to recognize the reactive force.

When the manipulating force of the user, which is applied to the joystick lever 210 to rotate the joystick lever 210 upon steering manipulation, is removed from the joystick lever 210, the joystick lever 210 is configured for being returned to the neutral position by the reactive force generated by the steering motor 410.

The integrated control apparatus 1 according to an exemplary embodiment of the present disclosure further includes a torque sensor module 800, which is disposed between the steering shifter 230 and the steering motor 410 to connect the steering shifter 230 and the steering motor 410 to each other. The torque sensor module 800 detects change of a magnetic field, which is caused by the rotational difference between the steering shifter 230 and the steering motor 410, upon steering manipulation, and is configured to perform feedback control for operation of the steering motor 410 by the difference between an actual steering manipulating force and the target steering manipulating force using the detected magnetic field.

The torque sensor module 800 according to an exemplary embodiment of the present disclosure includes a torsion bar 810, which connects a shift lever 236 connected to the steering shifter 230 and a motor lever 411 connected to the steering motor 410 to each other and which is twisted due to the rotational difference between the shift lever 236 and the motor lever 411 upon steering manipulation, third permanent magnets 820, which are provided at the two end portions of the torsion bar 810 and are respectively connected to the shift lever 236 and the motor lever 411, and a torque sensor PCB 850, which is fixed to a housing 830 fixed to the main body 100 and which includes third Hall sensors 840, which faces the third permanent magnet 820, to detect change of a magnetic field caused by the rotational difference between the shifter lever 236 and the motor lever 411 upon steering manipulation.

Third bearings 860 are respectively coupled to the shifter lever 236 and the motor lever 411, and the shifter lever 236 and the motor lever 411 are rotatably coupled to the housing 830 via the third bearings 860 disposed therebetween.

Figure 17:
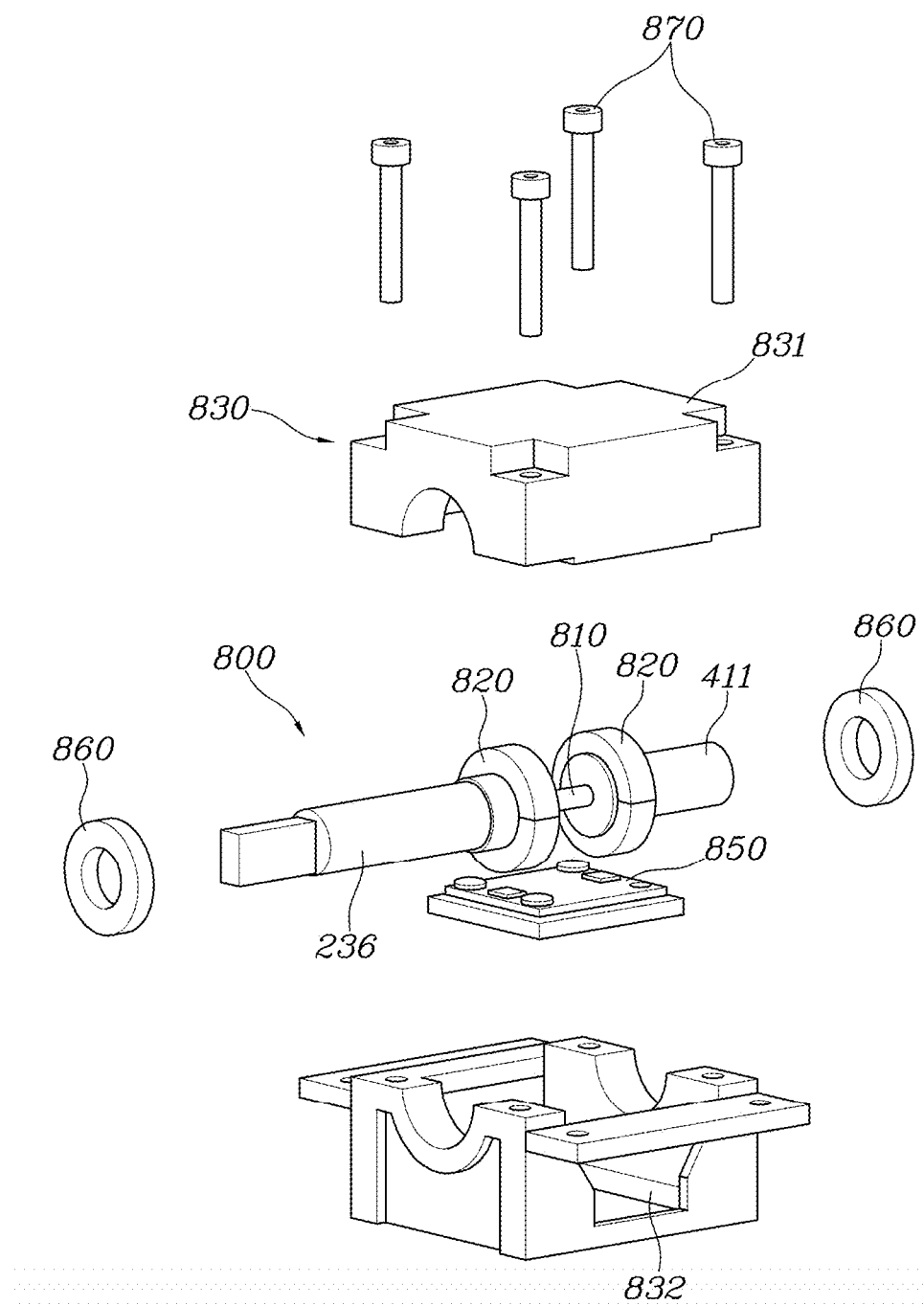
FIG. 17 and FIG. 18 are views explaining a torque sensor module according to an exemplary embodiment of the present disclosure.
Figure 18:
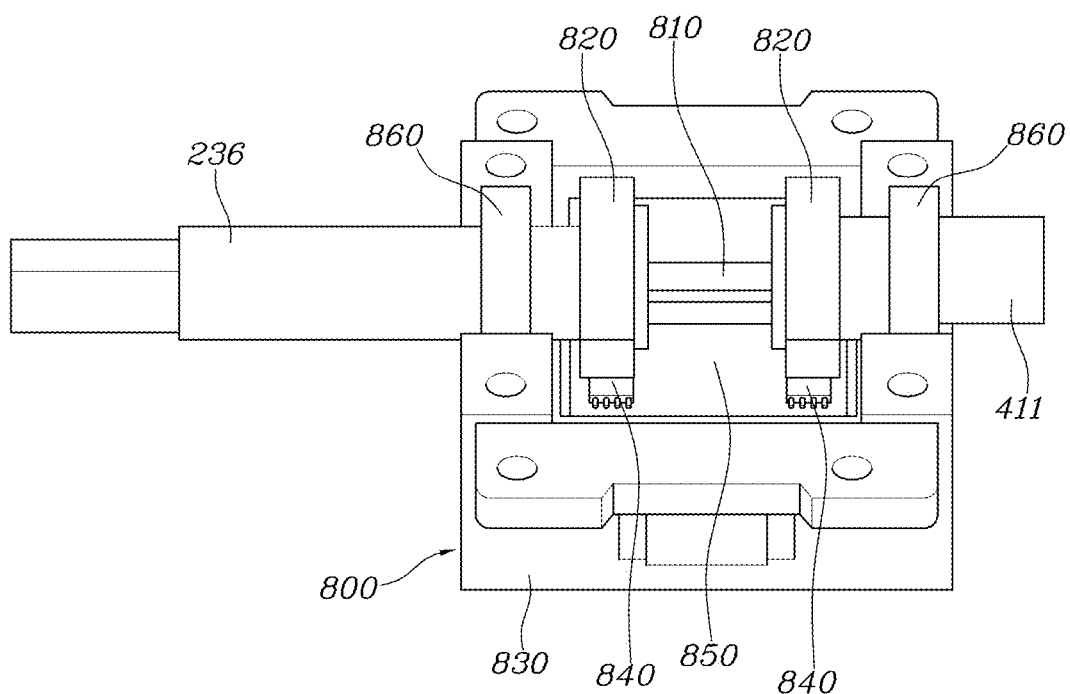

As illustrated in FIG. 17, the housing 830 is configured to be divided into an upper housing 831 and a lower housing 832, which are coupled to each other by a plurality of bolts 870.

The front end portion of the shifter lever 236 is connected to the steering shifter 230 for power transmission, and the rear end portion of the motor lever 411 is connected to the steering motor 410 for power transmission. The rear end portion of the shifter lever 236 and the front end portion of the motor lever 411 are connected to each other via the torsion bar 810.

The control module 700 according to an exemplary embodiment of the present disclosure includes the main PCB 710 fixed to the main body 100, and the motor controller 720 provided at the main PCB. The main PCB 710 is configured to transmit a signal to the motor controller 720.

The torque sensor PCB 850 detects change of a magnetic field caused by the rotational difference between the shifter lever 236 and the motor lever 411 upon steering manipulation, and transmits the change of the magnetic field to the main PCB 710. The main PCB 710 converts the change of the magnetic field into a torque value, and then evaluates the difference between an actual steering manipulating force and the target steering manipulating force. Thereafter, the torque sensor PCB 850 transmits a signal corresponding to the difference to the motor controller 720, and the motor controller 720 receives the signal from the main PCB 710 and is configured to perform feedback control for operation of the steering motor 410 by the value corresponding to the difference.

The torque sensor module 800 is constructed to connect the steering shifter 230 and the steering motor 410 to each other, and the measured value of the torque sensor module 800 is used in the feedback control of the steering motor 410, realizing precise steering feeling (target manipulating force).

The torque sensor module 800 directly measures manipulating force, which is felt by a driver when the driver is configured to perform steering operation by manipulating the joystick lever 210, and evaluates the difference between the felt manipulating force and the target steering manipulating force corresponding to the running condition of the vehicle. Accordingly, the torque sensor module 800 is configured to perform feedback control for the steering motor 410 using the evaluated difference, realizing more precise steering feeling.

The exemplary embodiment of the present disclosure further includes a neutral-returning module 1100, which is provided at the main body 100 and the joystick lever 210 in a state of being in contact therewith to serve to return the joystick lever 210 to the neutral position using elastic force.

The function of returning the joystick lever 210 to the neutral position after acceleration, deceleration and steering manipulation of the joystick lever 210 may be assigned to the acceleration and deceleration motor 310 and the steering motor 410.

When power supplied to the acceleration and deceleration motor 310 and the steering motor 410 is turned off due to malfunction or the like, it is possible to return the joystick lever 210 to the neutral position using the elastic force of the neutral-returning module 1100.

The neutral-returning module 1100 according to an exemplary embodiment of the present disclosure includes a support plate 1110, which is fixed to the main body 100 below the steering shifter 230 and includes a concave recess 1111 formed therein, a bullet 1120, which is provided at the lower end portion of the joystick lever 210 that extends through the steering shifter 230 and which is in contact with the recess 1111, and a bullet spring 1130 provided in the joystick lever 210 to elastically support the bullet 1120.

The neutral-returning module 1100, which includes the support plate 1110 including the recess 1111 therein, the bullet 1120, and the bullet spring 1130, serves a function of returning the joystick lever 210 to the neutral position as well as a function of improving manipulation feeling using spring force upon manipulation of the joystick lever 210.

In an exemplary embodiment of the present disclosure, the radius of recess 1111 is largest at the middle portion of the recess 1111 and smaller as approaching to the left and right ends of the recess 1111 such that the joystick lever 210 returns to the middle portion of the recess 1111, i.e., the neutral position of the joystick lever 210 using elastic force of the bullet spring 1120 when power to the acceleration and deceleration motor 310 and the steering motor 410 is turned off.

As is apparent from the above description, the integrated control apparatus according to an exemplary embodiment of the present disclosure is constructed so that acceleration, deceleration and steering operations of a vehicle are performed using the joystick lever 210, whereby manipulation of operations of the vehicle becomes easy thus satisfying user's needs and improving merchantability.

Furthermore, the integrated control apparatus according to an exemplary embodiment of the present disclosure includes the acceleration and deceleration actuator module 300, the steering actuator module 400, and the positions sensor modules 500 and 600 to detect the position of the joystick lever 210 upon acceleration, deceleration and steering manipulations and to transmit a signal pertaining to acceleration, deceleration and steering operation of a vehicle to the vehicle controller 910. The acceleration and deceleration actuator module 300 is constructed so that the acceleration and deceleration motor 310 generates torque to enable a driver to feel appropriate manipulating force corresponding to the position of the joystick lever 210, which is advantageous.

Furthermore, the integrated control apparatus according to an exemplary embodiment of the present disclosure has an advantage in that the torque sensor module 800, which is provided between the steering shifter 230 and the steering motor 410 for interconnection therebetween, directly measures manipulating force which is felt by a driver upon manipulation of the joystick lever 210 for steering operation, evaluates the difference between the measured manipulating force and the target manipulating force, and is configured to perform feedback control for the steering motor 410 using the evaluated difference, realizing more precise steering feeling.

Furthermore, the integrated control apparatus according to an exemplary embodiment of the present disclosure includes an advantage in that the sensor configured to detect the position of the joystick lever 210 upon acceleration and deceleration manipulations and the sensor configured to detect position of the joystick lever 210 upon steering manipulation share the single position sensor PCB 530, reducing the number of position sensor PCB 53 to the minimum and thus assuring reduction of manufacturing cost and easy layout.

Furthermore, the integrated control apparatus according to an exemplary embodiment of the present disclosure includes the neutral-returning module 1100 configured for returning the joystick lever 210 to the neutral position using elastic force when power to the acceleration and deceleration motor 310 and the steering motor 410 is turned off due to malfunction or the like, improving reliability of operation of the joystick lever 210, which is advantageous.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may be configured to process data according to a program provided from the memory, and may be configured to generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the memory and the processor may be provided as one chip, or provided as separate chips.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless stated otherwise, a singular expression includes a plural expression unless the context clearly indicates otherwise.

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An integrated control apparatus for a vehicle, the integrated control apparatus comprising:
    a main body;
    a joystick lever module, which is rotatably coupled to the main body and is configured for being manipulated by a user for acceleration, deceleration and steering of the vehicle;
    an acceleration and deceleration actuator module, which is coupled to the main body and is connected to the joystick lever module for power transmission, the acceleration and deceleration actuator module being configured to generate reactive force upon activation thereof and to return the joystick lever module, which has been rotated for the acceleration or the deceleration of the vehicle, to a neutral position using the generated reactive force of the acceleration and deceleration actuator module; and
    a steering actuator module, which is coupled to the main body and is connected to the joystick lever module for power transmission, the steering actuator module being configured to generate reactive force upon activation thereof and to return the joystick lever module, which has been rotated for the steering of the vehicle, to the neutral position using the generated reactive force of the steering actuator module;
    a first position sensor module provided at the joystick lever module and the main body to detect acceleration and deceleration positions of the joystick lever module; and
    a second position sensor module provided at the joystick lever module and the main body to detect a steering position of the joystick lever module,
    wherein the first position sensor module and the second position sensor module share a single position sensor PCB, and the single position sensor PCB is provided with a first Hall sensor and a second Hall sensor, which are spaced from each other.

2. The integrated control apparatus of claim 1, further including:
    a control module communicatively connected to the first position sensor module and the second position sensor module and configured to receive signals of the first and second position sensor modules and to generate signals pertaining to the acceleration, the deceleration and the steering of the vehicle to control operations of the acceleration and deceleration actuator module and the steering actuator module.

3. The integrated control apparatus of claim 1, wherein the joystick lever module is rotated forward or backward for the acceleration or the deceleration of the vehicle, and is rotated rightward or leftward for the steering of the vehicle.

4. The integrated control apparatus of claim 2, wherein the joystick lever module includes:
    a joystick lever configured for being gripped and manipulated by the user;
    an acceleration and deceleration shifter through which a lower end portion of the joystick lever extends and which includes a first hole, which extends rightward and leftward to allow rightward and leftward rotation of the joystick lever, the acceleration and deceleration shifter being coupled at right and left end portions thereof to the main body via first bearings to be rotatable in forward and backward; and a steering shifter, which is coupled to the lower end portion of the joystick lever, which extends through the acceleration and deceleration shifter, via a hinge and which includes a second hole, which extends forwards and backwards to allow forward and backward rotation of the joystick lever about the hinge, the steering shifter being coupled at front and rear end portions thereof to the main body via second bearings to be rotatable rightward and leftward.

5. The integrated control apparatus of claim 4, wherein a direct connecting structure is not provided between the acceleration and deceleration shifter and the steering shifter so that the acceleration and deceleration shifter and the steering shifter are not interlocked with each other upon the forward and backward rotation and the rightward and leftward rotation of the joystick lever.

6. The integrated control apparatus of claim 4, wherein the lower end portion of the joystick lever is provided with a guide protrusion, which projects outwards thereof, and the second hole is provided with a guide groove, which is in contact with the guide protrusion, to guide the forward and backward rotation of the joystick lever about the hinge.

7. The integrated control apparatus of claim 4, wherein the acceleration and deceleration actuator module includes:
 an acceleration and deceleration motor fixed to the main body;
 a drive gear rotatably coupled to the acceleration and deceleration motor; and
 a follower gear, which is provided at the acceleration and deceleration shifter and is engaged with the drive gear.

8. The integrated control apparatus of claim 7, wherein the first position sensor module includes:
 a first permanent magnet coupled to the acceleration and deceleration shifter; and
 the position sensor PCB, which is fixed to the main body and includes the first Hall sensor which faces the first permanent magnet, the position sensor PCB being configured to detect the acceleration and deceleration positions of the joystick lever based on change of magnetic flux caused by change of position of the first permanent magnet in response that the acceleration and deceleration shifter is rotated.

9. The integrated control apparatus of claim 8,
 wherein the control module includes a main PCB fixed to the main body and a motor controller provided at the main PCB,
 wherein the main PCB is configured to send a signal to the motor controller,
 wherein a signal of the position sensor PCB is transmitted to the main PCB, and
 wherein the motor controller is configured to receive the signal of the main PCB to control an operation of the acceleration and deceleration motor.

10. The integrated control apparatus of claim 8, wherein the steering actuator module is fixed to the main body, and includes a steering motor connected to the steering shifter for power transmission.

11. The integrated control apparatus of claim 10, wherein the second position sensor module includes:
 a second permanent magnet connected to the steering shifter; and
 the second Hall sensor provided at the position sensor PCB to face the second permanent magnet, and
 wherein the position sensor PCB is configured for detecting a steering position of the joystick lever based on change of magnetic flux attributable to change of position of the second permanent magnet in response that the steering shifter is rotated.

12. The integrated control apparatus of claim 11,
 wherein the second position sensor module further includes a ball guide to which the second permanent magnet is coupled and which is connected to the steering shifter, and
 wherein a first end portion of the ball guide is formed to include a shape of a sphere and is in contact with the steering shifter, and a second end portion of the ball guide extends in a lateral direction of the steering shifter and is coupled to the second permanent magnet, the ball guide including protrusions, which project forwards and backwards and are coupled to the main body to be rotatable rightward and leftward.

13. The integrated control apparatus of claim 12,
 wherein the position sensor PCB is disposed at one side of a rotation axis of the acceleration and deceleration shifter,
 wherein the rotation axis of the acceleration and deceleration shifter and a rotation axis of the steering shifter are disposed to be orthogonal to each other,
 wherein the ball guide is disposed at one side based on the rotation axis of the steering shifter so that the second end portion of the ball guide, to which the second permanent magnet is coupled, faces the position sensor PCB, and
 wherein the ball guide is disposed to be parallel to the rotation axis of the acceleration and deceleration shifter in response that the joystick lever is not manipulated.

14. The integrated control apparatus of claim 11,
 wherein the control module includes a main PCB fixed to the main body and a motor controller provided at the main PCB,
 wherein the main PCB is configured to send a signal to the motor controller,
 wherein a signal of the position sensor PCB is transmitted to the main PCB, and
 wherein the motor controller is configured to receive the signal of the main PCB to control an operation of the steering motor.

15. The integrated control apparatus of claim 11, further including a torque sensor module disposed between the steering shifter and the steering motor to connect the steering shifter and the steering motor to each other, the torque sensor module being configured to detect change of a magnetic field, which is caused by a rotational difference between the steering shifter and the steering motor, upon steering manipulation, and to perform feedback control for operation of the steering motor by a difference between an actual steering manipulating force and a target steering manipulating force using the detected magnetic field.

16. The integrated control apparatus of claim 15, wherein the torque sensor module includes:
 a torsion bar, which connects a shift lever connected to the steering shifter and a motor lever connected to the steering motor to each other and which is twisted due to a rotational difference between the shift lever and the motor lever upon steering manipulation;
 third permanent magnets coupled to the shift lever and the motor lever, respectively; and
 a torque sensor PCB, which is fixed to a housing fixed to the main body and which includes third Hall sensors, which faces the third permanent magnets, to detect change of a magnetic field caused by the rotational difference between the shifter shift lever and the motor lever upon steering manipulation.

17. The integrated control apparatus of claim 16,
wherein the control module includes a main PCB fixed to the main body and a motor controller provided at the main PCB,
wherein the main PCB is configured to send a signal to the motor controller,
wherein the torque sensor PCB is configured to detect change of a magnetic field caused by a rotational difference between the shift lever and the motor lever upon steering manipulation and to transmit the change of the magnetic field to the main PCB,
wherein the main PCB is configured to convert the change of the magnetic field into a torque value, to evaluates a difference between an actual steering manipulating force and a target steering manipulating force, and to transmit a signal corresponding to the difference to the motor controller, and
wherein the motor controller is configured to receive the signal from the main PCB and is configured to perform feedback control for operation of the steering motor by a value corresponding to the difference.

18. The integrated control apparatus of claim 4, further including a neutral-returning module, which is provided at the main body and the joystick lever in a state of being in contact therewith to return the joystick lever to the neutral position using elastic force.

19. The integrated control apparatus of claim 18, wherein the neutral-returning module includes:
a support plate, which is fixed to the main body below the steering shifter and includes a concave recess formed therein;
a bullet, which is provided at the lower end portion of the joystick lever that extends through the steering shifter and which is in contact with the recess; and
a bullet spring provided at the joystick lever to elastically support the bullet.

20. An integrated control apparatus for a vehicle, the integrated control apparatus comprising:
a main body;
a joystick lever module, which is rotatably coupled to the main body and is configured for being manipulated by a user for acceleration, deceleration and steering of the vehicle;
an acceleration and deceleration actuator module, which is coupled to the main body and is connected to the joystick lever module for power transmission, the acceleration and deceleration actuator module being configured to generate reactive force upon activation thereof and to return the joystick lever module, which has been rotated for the acceleration or the deceleration of the vehicle, to a neutral position using the generated reactive force of the acceleration and deceleration actuator module; and
a steering actuator module, which is coupled to the main body and is connected to the joystick lever module for power transmission, the steering actuator module being configured to generate reactive force upon activation thereof and to return the joystick lever module, which has been rotated for the steering of the vehicle, to the neutral position using the generated reactive force of the steering actuator module,
wherein the steering actuator module is fixed to the main body, and includes a steering motor connected to a steering shifter provided in the joystick lever module for power transmission, and
wherein a torque sensor module is disposed between the steering shifter and the steering motor to connect the steering shifter and the steering motor to each other, the torque sensor module being configured to detect change of a magnetic field, which is caused by a rotational difference between the steering shifter and the steering motor, upon steering manipulation, and to perform feedback control for operation of the steering motor by a difference between an actual steering manipulating force and a target steering manipulating force using the detected magnetic field.

21. An integrated control apparatus for a vehicle, the integrated control apparatus comprising:
a main body;
a joystick lever module, which is rotatably coupled to the main body and is configured for being manipulated by a user for acceleration, deceleration and steering of the vehicle;
an acceleration and deceleration actuator module, which is coupled to the main body and is connected to the joystick lever module for power transmission, the acceleration and deceleration actuator module being configured to generate reactive force upon activation thereof and to return the joystick lever module, which has been rotated for the acceleration or the deceleration of the vehicle, to a neutral position using the generated reactive force of the acceleration and deceleration actuator module;
a steering actuator module, which is coupled to the main body and is connected to the joystick lever module for power transmission, the steering actuator module being configured to generate reactive force upon activation thereof and to return the joystick lever module, which has been rotated for the steering of the vehicle, to the neutral position using the generated reactive force of the steering actuator module;
a first position sensor module provided at the joystick lever module and the main body to detect acceleration and deceleration positions of the joystick lever module; and
a second position sensor module provided at the joystick lever module and the main body to detect a steering position of the joystick lever module,
wherein the joystick lever module includes:
a joystick lever configured for being gripped and manipulated by the user;
an acceleration and deceleration shifter through which a lower end portion of the joystick lever extends and which includes a first hole, which extends rightward and leftward to allow rightward and leftward rotation of the joystick lever, the acceleration and deceleration shifter being coupled at right and left end portions thereof to the main body via first bearings to be rotatable in forward and backward; and
a steering shifter, which is coupled to the lower end portion of the joystick lever, which extends through the acceleration and deceleration shifter, via a hinge and which includes a second hole, which extends forwards and backwards to allow forward and backward rotation of the joystick lever about the hinge, the steering shifter being coupled at front and rear end portions thereof to the main body via second bearings to be rotatable rightward and leftward,
wherein the second position sensor module further includes a ball guide to which a permanent magnet is coupled and which is connected to the steering shifter, and
wherein a first end portion of the ball guide is formed to include a shape of a sphere and is in contact with the steering shifter, and a second end portion of the ball guide extends in a lateral direction of the steering shifter and is coupled to the permanent magnet, the ball guide including protrusions, which project forwards and backwards and are coupled to the main body to be rotatable rightward and leftward.

\* \* \* \* \*